(12) United States Patent
Ruybal et al.

(10) Patent No.: US 10,518,767 B2
(45) Date of Patent: Dec. 31, 2019

(54) SYSTEMS AND METHODS FOR CONTROLLING AN ENGINE START IN A HYBRID VEHICLE

(71) Applicant: Ford Global Technologies, LLC, Dearborn, MI (US)

(72) Inventors: Kevin Ray Ruybal, Canton, MI (US); Jason Meyer, Canton, MI (US); Jeffrey Allen Doering, Canton, MI (US); Matthew John Shelton, Grosse Ile, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 15/671,386

(22) Filed: Aug. 8, 2017

(65) Prior Publication Data

US 2018/0244261 A1 Aug. 30, 2018

Related U.S. Application Data

(60) Provisional application No. 62/463,472, filed on Feb. 24, 2017.

(51) Int. Cl.
*B60W 20/40* (2016.01)
*F02D 41/06* (2006.01)
(Continued)

(52) U.S. Cl.
CPC ............... *B60W 20/40* (2013.01); *B60K 6/48* (2013.01); *B60W 10/02* (2013.01); *B60W 10/06* (2013.01);
(Continued)

(58) Field of Classification Search
CPC ...... B60W 20/40; B60W 20/30; B60W 10/02; B60W 10/06; B60W 10/08; B60W 10/11;
(Continued)

(56) References Cited

U.S. PATENT DOCUMENTS 4,875,391 A 10/1989 Leising et al.
5,115,698 A 5/1992 Leising et al.
(Continued)

OTHER PUBLICATIONS

Ruybal, K. et al., "Systems and Methods for Controlling an Engine Start in a Hybrid Vehicle," U.S. Appl. No. 15/671,333, filed Aug. 8, 2017, 108 pages.
(Continued)

*Primary Examiner* — Behrang Badii
*Assistant Examiner* — Daniel L Greene
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, and a transmission, where the transmission is downstream of the engine, and where the electric machine is downstream of the transmission. In one example, while the vehicle is being propelled solely via the electric machine, one or more gears of the transmission may be pre-engaged or selected, to prepare the driveline for an engine start event. In this way, driveline torque disturbance and delays in torque requests may be reduced or avoided upon a request for an engine start event.

19 Claims, 15 Drawing Sheets

(51) Int. Cl.
*F02D 41/26* (2006.01)
*B60W 10/06* (2006.01)
*B60W 10/08* (2006.01)
*B60W 10/02* (2006.01)
*B60K 6/48* (2007.10)
*B60W 10/11* (2012.01)
*B60W 10/30* (2006.01)
*B60W 20/30* (2016.01)
*F02N 11/04* (2006.01)

(52) U.S. Cl.
CPC ............ *B60W 10/08* (2013.01); *B60W 10/11* (2013.01); *B60W 10/30* (2013.01); *B60W 20/30* (2013.01); *F02D 41/062* (2013.01); *F02D 41/26* (2013.01); *B60W 2510/083* (2013.01); *B60W 2510/087* (2013.01); *B60W 2510/244* (2013.01); *B60W 2540/10* (2013.01); *B60W 2710/021* (2013.01); *B60W 2710/028* (2013.01); *B60W 2710/081* (2013.01); *F02N 11/04* (2013.01); *Y10S 903/903* (2013.01); *Y10S 903/909* (2013.01); *Y10S 903/915* (2013.01); *Y10S 903/946* (2013.01)

(58) Field of Classification Search
CPC ...... B60W 10/30; F02D 41/062; F02D 41/26; F02N 11/04
See application file for complete search history.

(56) References Cited

U.S. PATENT DOCUMENTS

| | | | | |
|---|---|---|---|---|
| 6,712,734 | B1* | 3/2004 | Loeffler | B60K 6/40 477/5 |
| 8,647,231 | B2 | 2/2014 | Soliman et al. | |
| 8,706,337 | B2 | 4/2014 | Rauner et al. | |
| 9,415,761 | B2 | 8/2016 | Gibson et al. | |
| 9,452,748 | B2 | 9/2016 | Gibson et al. | |
| 2005/0040783 | A1* | 2/2005 | Hemphill | F16H 61/32 318/468 |
| 2005/0064987 | A1* | 3/2005 | Budal | B60K 28/16 477/3 |
| 2005/0067200 | A1* | 3/2005 | Jiang | B60K 6/48 180/65.25 |
| 2005/0096804 | A1* | 5/2005 | Gee | B60K 5/1283 701/22 |
| 2009/0005215 | A1* | 1/2009 | Silveri | B60W 20/30 477/5 |
| 2009/0118963 | A1* | 5/2009 | Heap | B60K 6/365 701/99 |
| 2009/0149295 | A1* | 6/2009 | Yamamoto | B60K 6/48 477/109 |
| 2011/0071001 | A1 | 3/2011 | Yu et al. | |
| 2011/0198139 | A1* | 8/2011 | Fuechtner | B60K 6/48 180/65.25 |
| 2011/0295483 | A1 | 12/2011 | Ma et al. | |
| 2012/0028749 | A1* | 2/2012 | Kawasaki | B60K 6/48 475/211 |
| 2012/0115676 | A1* | 5/2012 | Schiele | B60K 6/48 477/5 |
| 2012/0304816 | A1* | 12/2012 | Yagi | F16H 61/0021 74/665 B |
| 2013/0045833 | A1* | 2/2013 | Okubo | B60K 6/387 477/5 |
| 2014/0073478 | A1 | 3/2014 | Hashemi et al. | |
| 2015/0166064 | A1* | 6/2015 | Mitsuyasu | F16H 61/21 701/54 |
| 2015/0210266 | A1* | 7/2015 | Yang | B60K 6/387 701/22 |
| 2016/0033034 | A1* | 2/2016 | Weingartz | F16H 61/688 701/58 |
| 2016/0046282 | A1* | 2/2016 | Yamazaki | B60W 20/40 477/5 |
| 2017/0166191 | A1* | 6/2017 | Iwata | B60K 6/36 |
| 2018/0119808 | A1* | 5/2018 | Miller | B60W 20/00 |
| 2018/0208202 | A1 | 7/2018 | Kobayashi et al. | |
| 2018/0229712 | A1* | 8/2018 | Shelton | B60W 10/02 |

OTHER PUBLICATIONS

United States Patent and Trademark Office, Office Action Issued in U.S. Appl. No. 15/671,333, dated Sep. 24, 2018, 25 pages.

* cited by examiner

SYSTEMS AND METHODS FOR CONTROLLING AN ENGINE START IN A HYBRID VEHICLE

CROSS REFERENCE TO RELATED APPLICATION

The present application claims priority to U.S. Provisional Patent Application No. 62/463,472, filed Feb. 24, 2017. The entire contents of the above-referenced application are hereby incorporated by reference in its entirety for all purposes.

FIELD

The present description relates generally to methods and systems for controlling a transmission during a rolling hybrid engine start event.

BACKGROUND/SUMMARY

For a hybrid vehicle utilizing an internal combustion engine coupled to a step ratio transmission (e.g. conventional planetary automatic transmission, automated single clutch manual, dual clutch transmission, etc.), with at least one electric machine delivering torque to driven wheels after the transmission, there can be powertrain modes that propel the vehicle using only the electric machine with the transmission input coupling open, allowing the engine to be stationary and off. If the vehicle is being driven in such a mode at non-zero speeds, and a total powertrain output torque request exceeds the propulsion capability of the electric motor(s), the engine may need to be started and connected to the driveline to deliver additional torque. The inventors have herein recognized that adding engine torque to driven wheels should be done smoothly and as quickly as possible to reduce delays between a vehicle operator's input and/or expectations, and the actual vehicle acceleration response. In some cases, the engine may need to be connected to driven wheels through a higher transmission gear ratio to achieve higher torque multiplication, to meet high total powertrain output torque requests. At lower powertrain output torque request, the engine may be connected at a lower transmission gear ratio to reduce engine seed, sound volume, and potential driveline disturbance at connection. At higher vehicle speeds, a higher gear ratio may result in a higher input shaft rotational speed that the engine may need to match to lock the input clutch and transmit the requested torque to driven wheels. Since the engine is starting from zero speed, it may take some time to start combustion and accelerate its inertia up to a desired speed to connect the engine to the transmission input. While the engine is accelerating up to the target speed, it may not transmit any torque to the driven wheels, resulting in a delay between a request for engine torque and the engine transmitting torque to the wheels. If the engine quickly connects to the transmission input, but the transmission is in the wrong gear, an additional time delay may result for the transmission to shift to the appropriate gear ratio to meet the required drivetrain torque after the engine connects. If the vehicle is in neutral with no internal shift elements engaged to connect the transmission input to the output, the transmission must first shift into the appropriate gear ratio before the engine can be connected. This adds additional delay to the total driveline torque response, and additional torque must be taken from the driveline (electric motor, vehicle inertia, etc.) to accelerate the rotating inertia of the internal components of the transmission to lock the desired gear before the engine may be connected. The torque for completing such a shift may reduce an acceleration capability of the vehicle being propelled by the electric machine before the engine has been connected to the driveline.

An optimal vehicle response may be achieved if the transmission is in an optimal gear at a time when the engine connects to the driveline. Such a response may be further improved if the transmission is in an optimal gear prior to the engine being commanded to start and connect to the driveline as there may not be any time or energy lost due to shifting the transmission into an optimal gear for connection during the engine starting process. The inventors have thus herein developed systems and methods to at least partially address the above-mentioned issues. In one example a driveline operating method comprises propelling a vehicle solely via an electric machine while an engine of the vehicle is off and not connected to a transmission, the electric machine positioned in the driveline downstream of the transmission, and engaging one or more gears of the transmission with the engine off, to prepare the driveline for an engine start event to meet a vehicle operator torque request.

In one example of the method, engaging one or more gears further comprises engaging one or more gears with a lowest torque multiplication available that allows an input shaft to the transmission to remain above an engine idle speed while the vehicle is propelled solely via the electric machine. In such an example, the method may further comprise shifting the one or more gears to another gear to meet the vehicle operator torque request prior to connecting the engine to the transmission.

In another example of the method, the method may further comprise predicting vehicle operating conditions that may result in the engine start event. In such an example, vehicle operating conditions that result in the engine start event may include a minimum accelerator pedal position and a current vehicle speed. In some examples, engaging the one or more gears of the transmission may further comprise engaging a target gear comprising an optimal gear for connecting the engine to the transmission at the time of the engine start event.

In another example, engaging one or more gears of the transmission may further comprise additionally engaging a non-target gear, where the transmission comprises a dual clutch transmission. In such an example, the non-target gear may comprise a sequentially lower gear than the target gear, provided that the target gear is not the lowest available gear. In another example the non-target gear may comprise a sequentially higher gear than the target gear, provided that the target gear is not the highest available gear.

An example, the target gear may comprise an optimal gear for connecting the engine to the transmission at the time of the engine start event, and where the non-target gear may correspond to an appropriate gear ratio for a current accelerator pedal position and vehicle speed. Furthermore, engaging the one or more gears in the above-mentioned examples may include operating an electric transmission pump to provide hydraulic fluid to actuate one or more shift elements of the transmission. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling a dual clutch transmission during a rolling hybrid engine start event. FIGS. 1A-3 show an example hybrid vehicle system that includes a driveline with a motor, an integrated starter/generator, a dual clutch transmission, and an electric machine that is positioned downstream of the dual clutch transmission. It may be understood that herein, downstream of the dual clutch transmission is relative to positive torque flow from the engine to vehicle wheels, for example.

Figure 4:
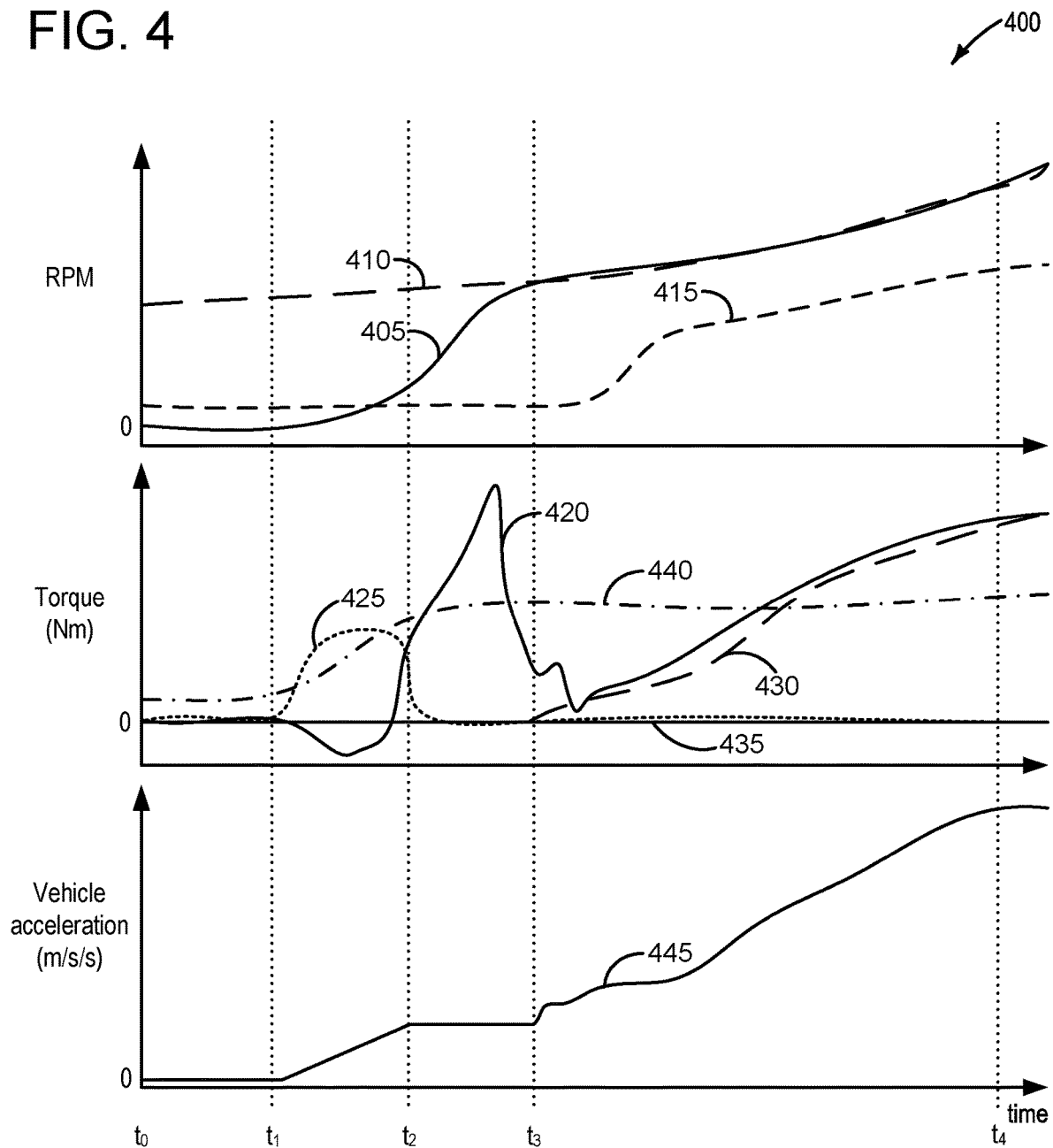
FIG. 4 shows an example timeline illustrating a delay between a request for engine torque, and the engine transmitting torque to driven wheels.
Figure 5:
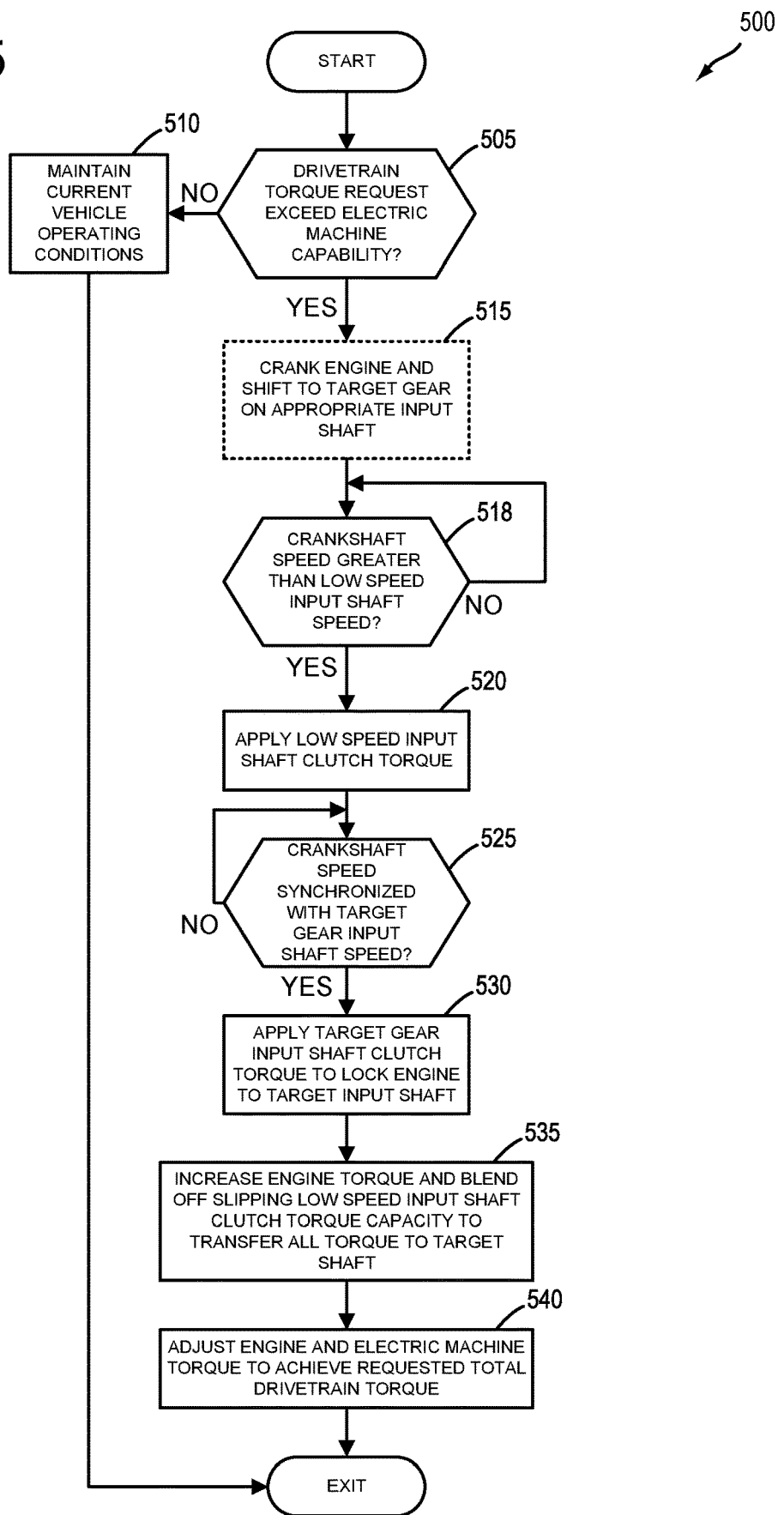
FIG. 5 shows a high level flowchart for an example method for avoiding a delay between a request for engine torque, and the engine transmitting torque to driven wheels.
Figure 6:
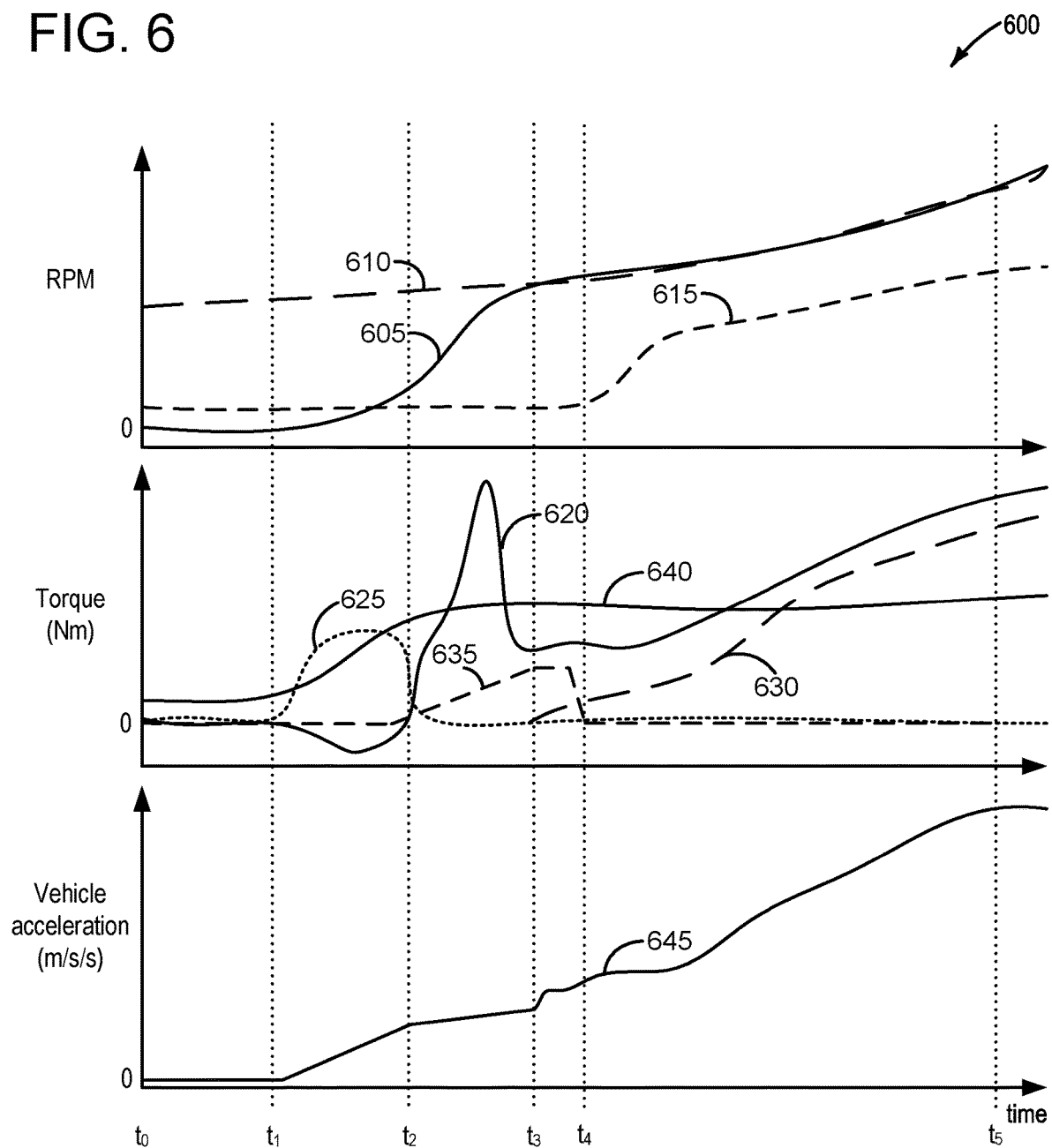
FIG. 6 shows an example timeline illustrating an avoidance of a delay between a request for engine torque, and the engine transmitting torque to driven wheels, according to the method of FIG. 5.
Figure 7:
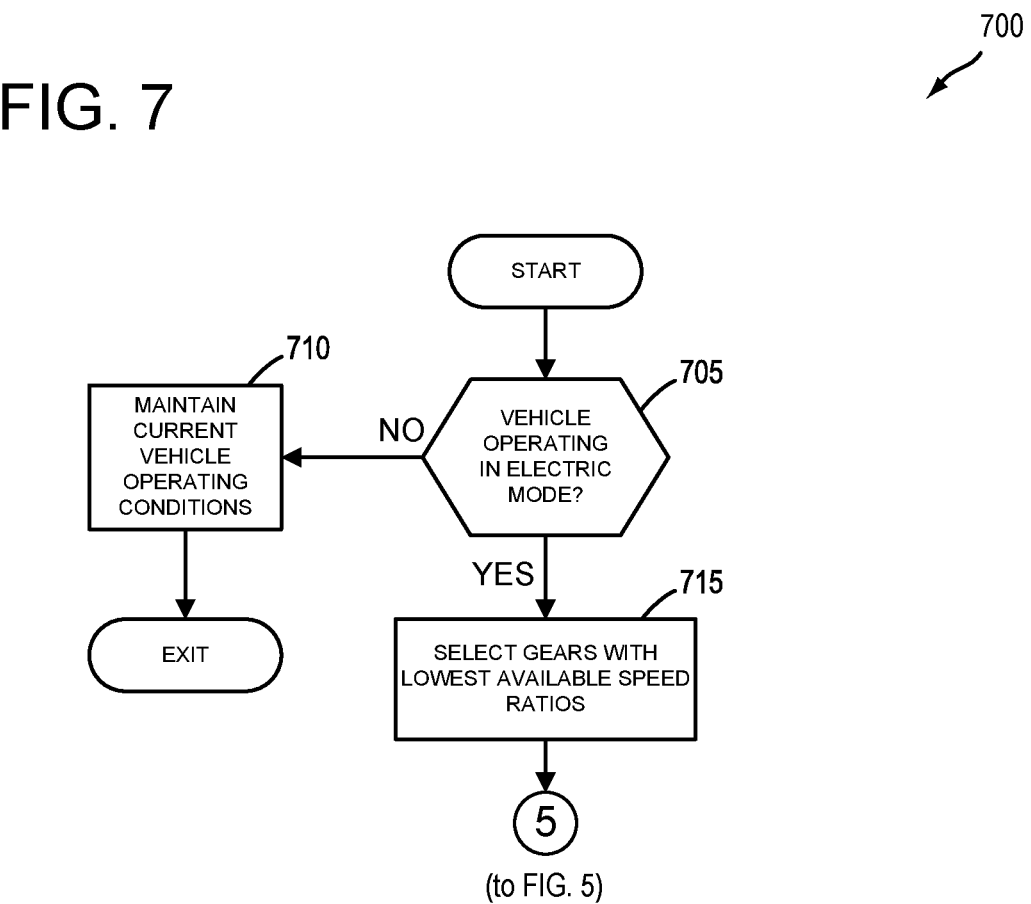
FIG. 7 shows a high level flowchart for an example method for selecting gears while a vehicle is operating in an electric-only mode of operation, which may be utilized in conjunction with the method of FIG. 5.
Figure 8:
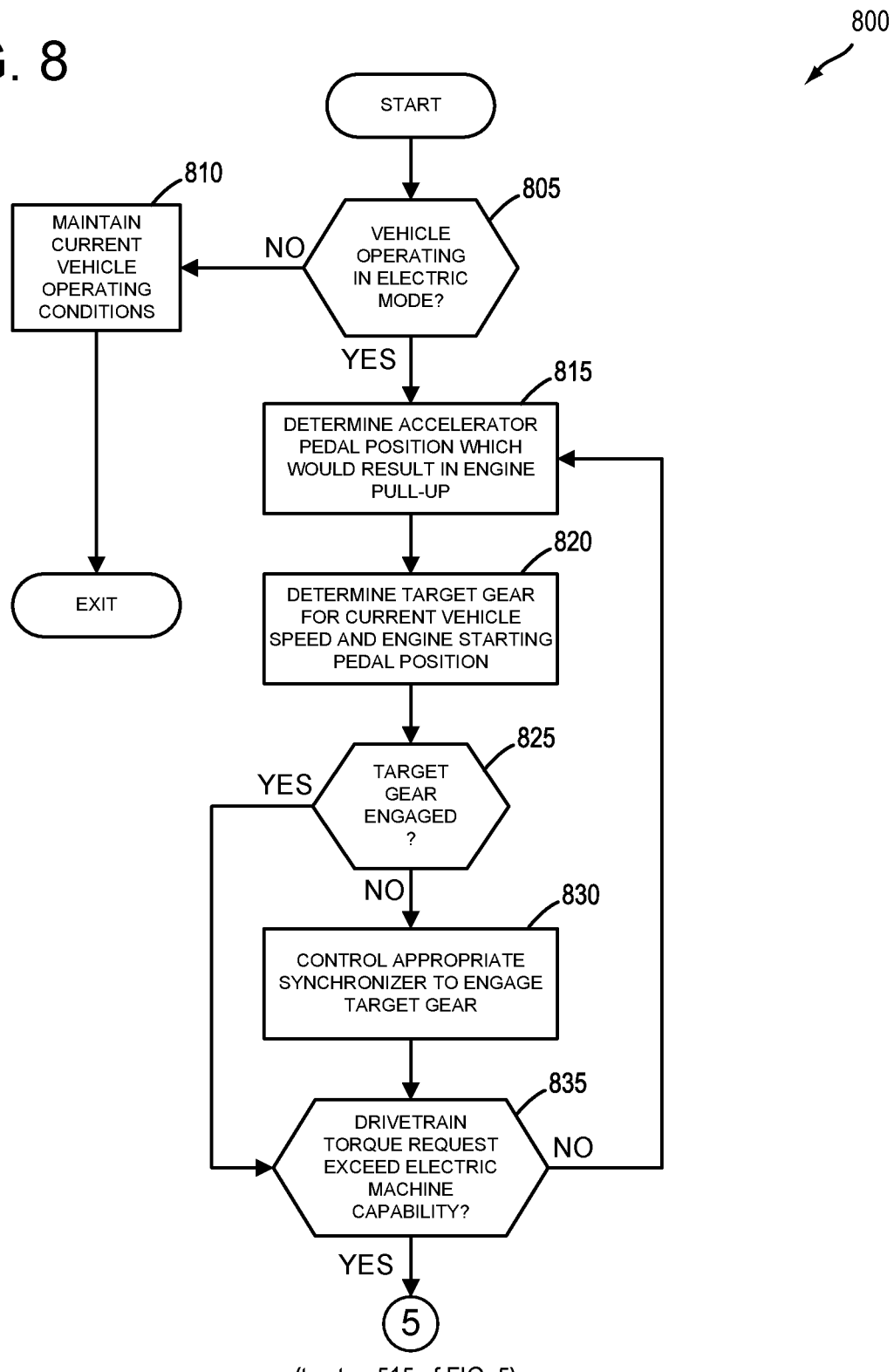
FIG. 8 shows a high level flowchart for an example method for predicting a target gear and selecting the target gear while the vehicle is operating in an electric-only mode of operation, which may be utilized in conjunction with the method of FIG. 5.
Figure 9:
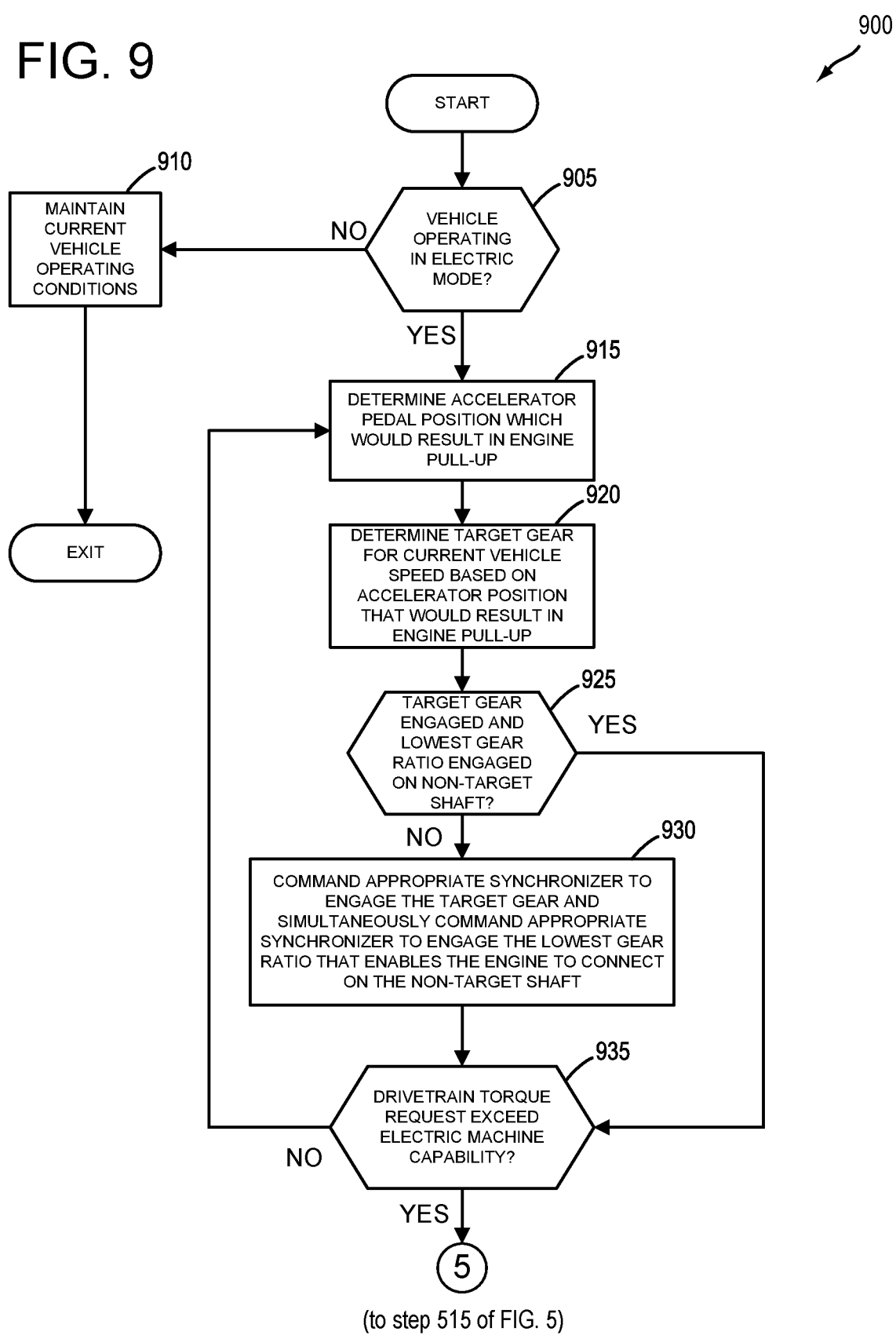
FIG. 9 shows a high level flowchart for an example method for predicting a target gear and selecting both the target gear and a non-target gear while the vehicle is operating in an electric-only mode of operation, which may be utilized in conjunction with the method of FIG. 5.
Figure 10:
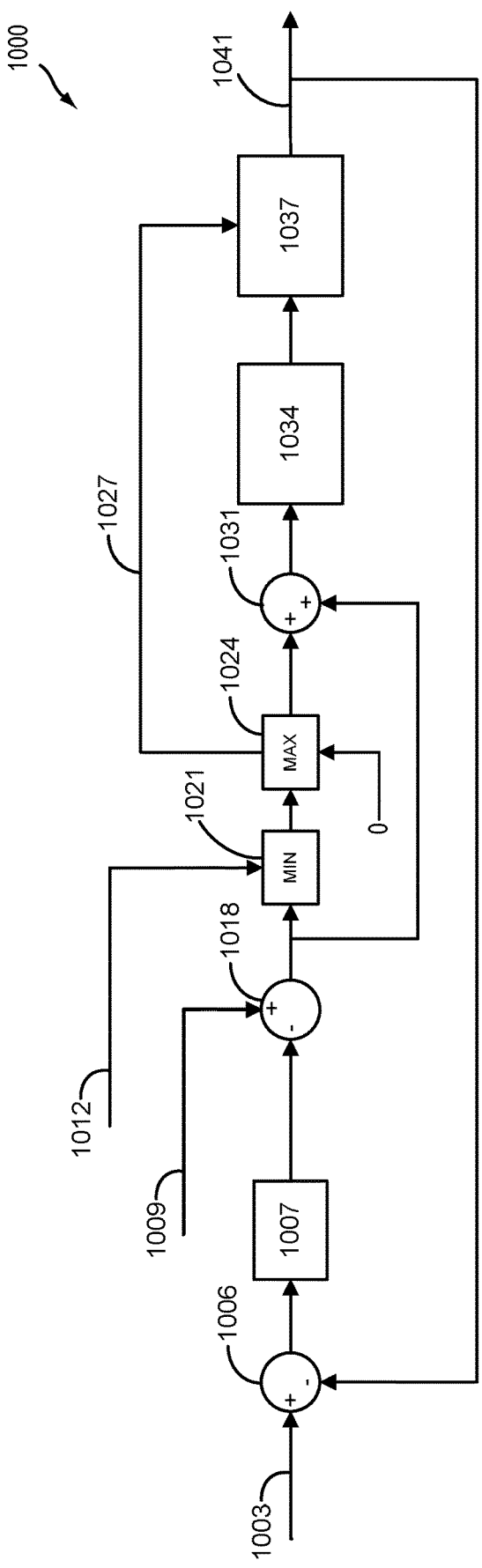
FIGS. 10-11 show block diagrams for controlling clutch capacity and engine speed to avoid a delay between a request for engine torque, and the engine transmitting torque to driven wheels, which may be utilized in conjunction with the method of FIG. 5.
Figure 11:
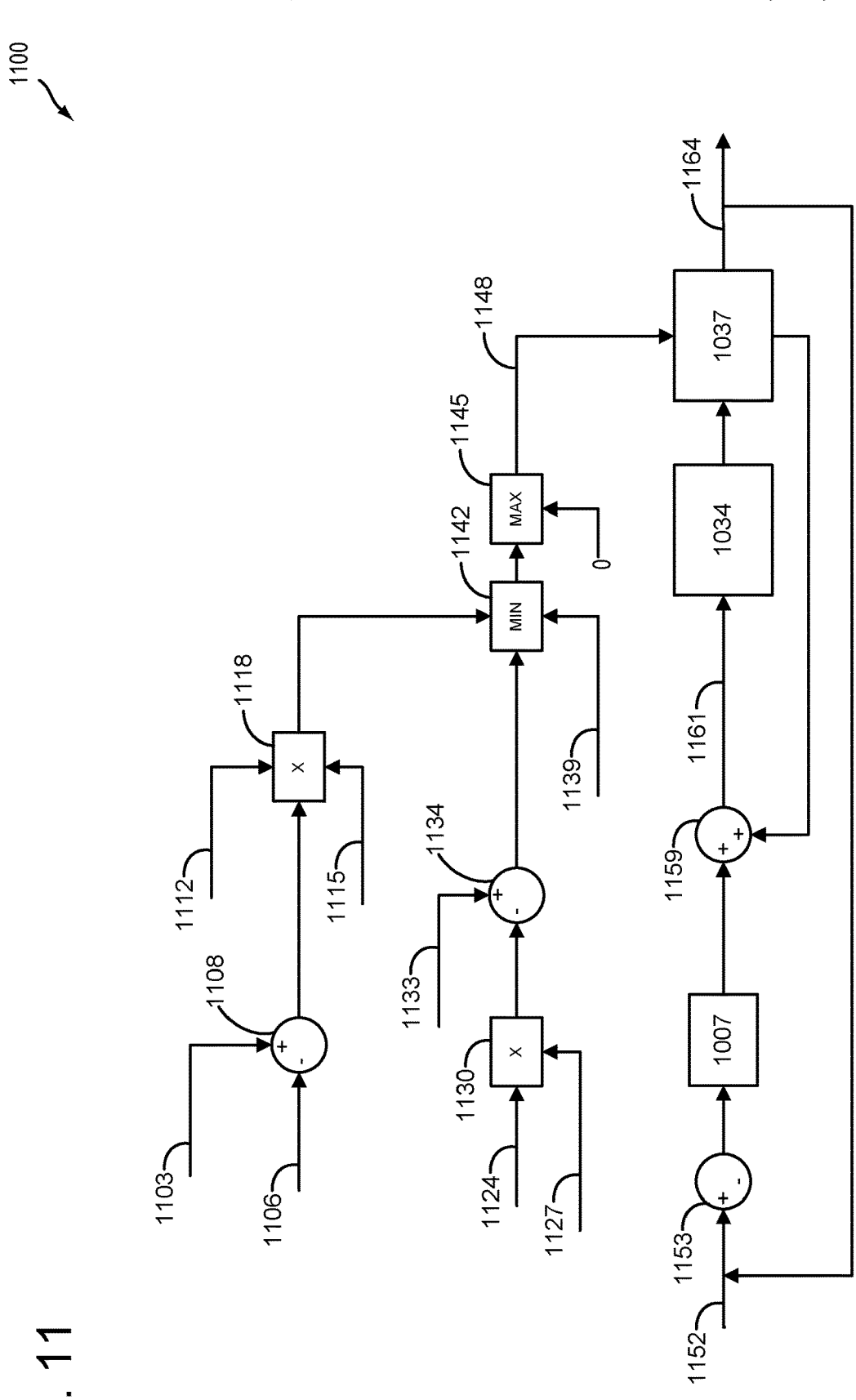

FIGS. 4-6 describe and show ways to reduce a plateau in vehicle acceleration during an engine start event, where the engine start event is in response to a vehicle operator demanded wheel torque exceeding a capacity of the electric machine. Briefly, a vehicle acceleration plateau may be reduced via transmitting engine torque through the transmission via a low speed input shaft of the dual clutch transmission, while at the same instance engine speed is increasing to a target engine speed. FIGS. 7-9 describe ways of preselecting different gear ratios of the dual clutch transmission while the vehicle is operating solely in an electric mode of operation, to prepare for an engine start event. FIGS. 10-11 show and describe ways of controlling clutch capacity of the dual clutch transmission in order to transiently transmit engine torque through the dual clutch transmission via the second input shaft while engine speed is increasing to the target engine speed. These various ways of preselecting and controlling can be used together in various combinations and/or separately, if desired.

Figure 12:
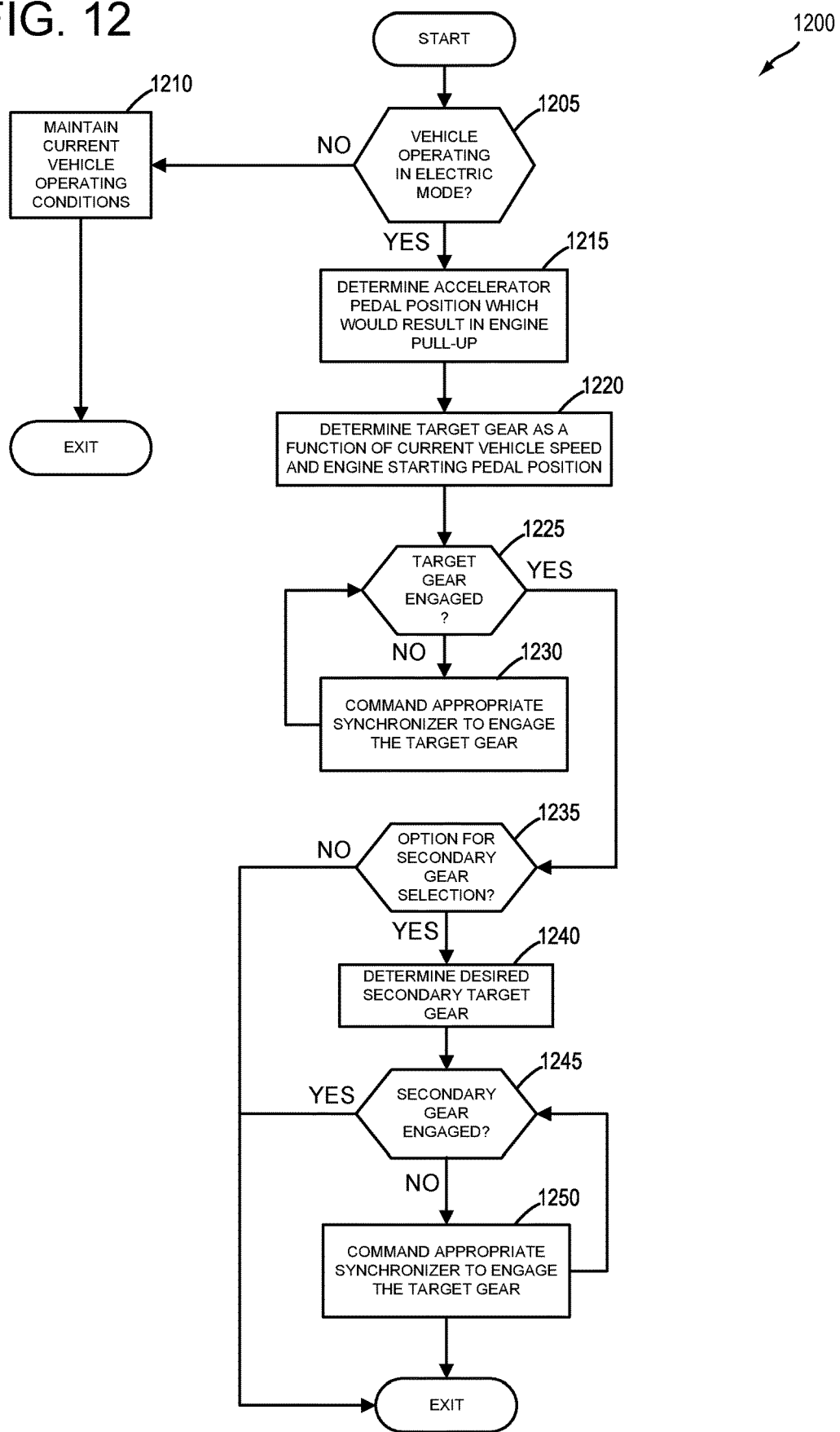
FIG. 12 shows a high level flowchart for an example method for predicting and engaging a target gear, and in some examples, a non-target gear, while a vehicle is operating in an electric mode of operation.

FIG. 12 describes and shows methods for predicting and engaging a target gear, and in examples where a vehicle transmission comprises a dual clutch transmission, a non-target gear, while the vehicle is being propelled solely via electric power, in preparation for an engine start event. The method of FIG. 12 may be used in conjunction with the method of FIG. 5, for example. In one example of the method depicted at FIG. 12, target and non-target gears may be selected based on an engine start event where a wheel torque demand comprises a vehicle operator stepping fully into an accelerator pedal. In such an example, the preselected gears may not be appropriate for an engine start request due to a request for cabin heating/cooling, battery charging, etc. In such an example, a gear shift may be conducted in response to such a request, according to the method of FIG. 13. FIG. 14 shows an example timeline for preselecting gears and shifting to an appropriate gear responsive to an engine start request involving a request for cabin heating/cooling, battery charge maintenance, etc.

Figure 1A:
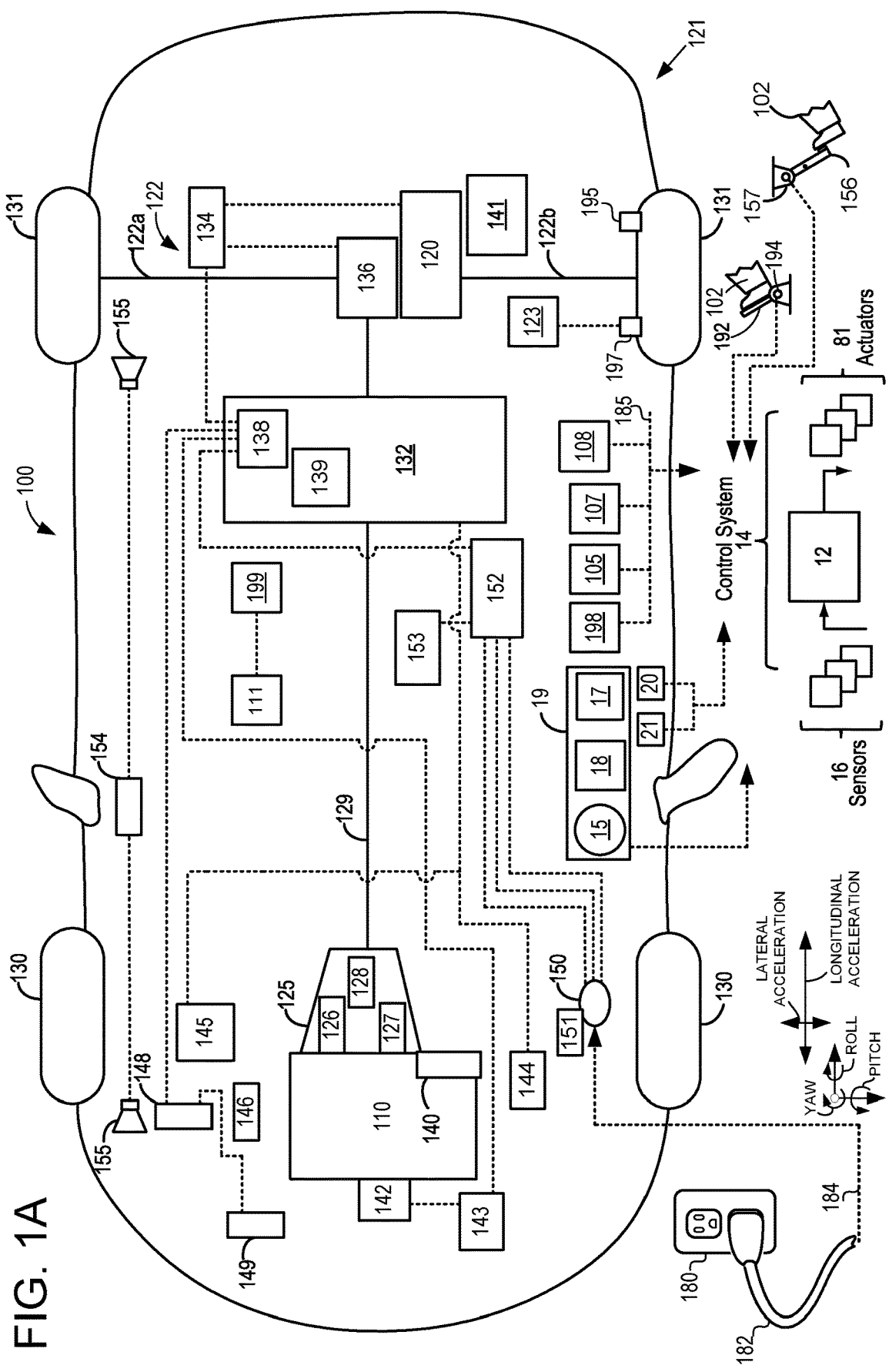
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110

(e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127. It may be understood that opening and closing of first clutch 126 and second clutch 127 may be conducted hydraulically, for example. In other words, controlling a torque capacity of first clutch, or controlling a torque capacity of second clutch 127 may be conducted by controlling an application pressure of a fluid to first clutch 126 and/or second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-byaxle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIGS. 1B-3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
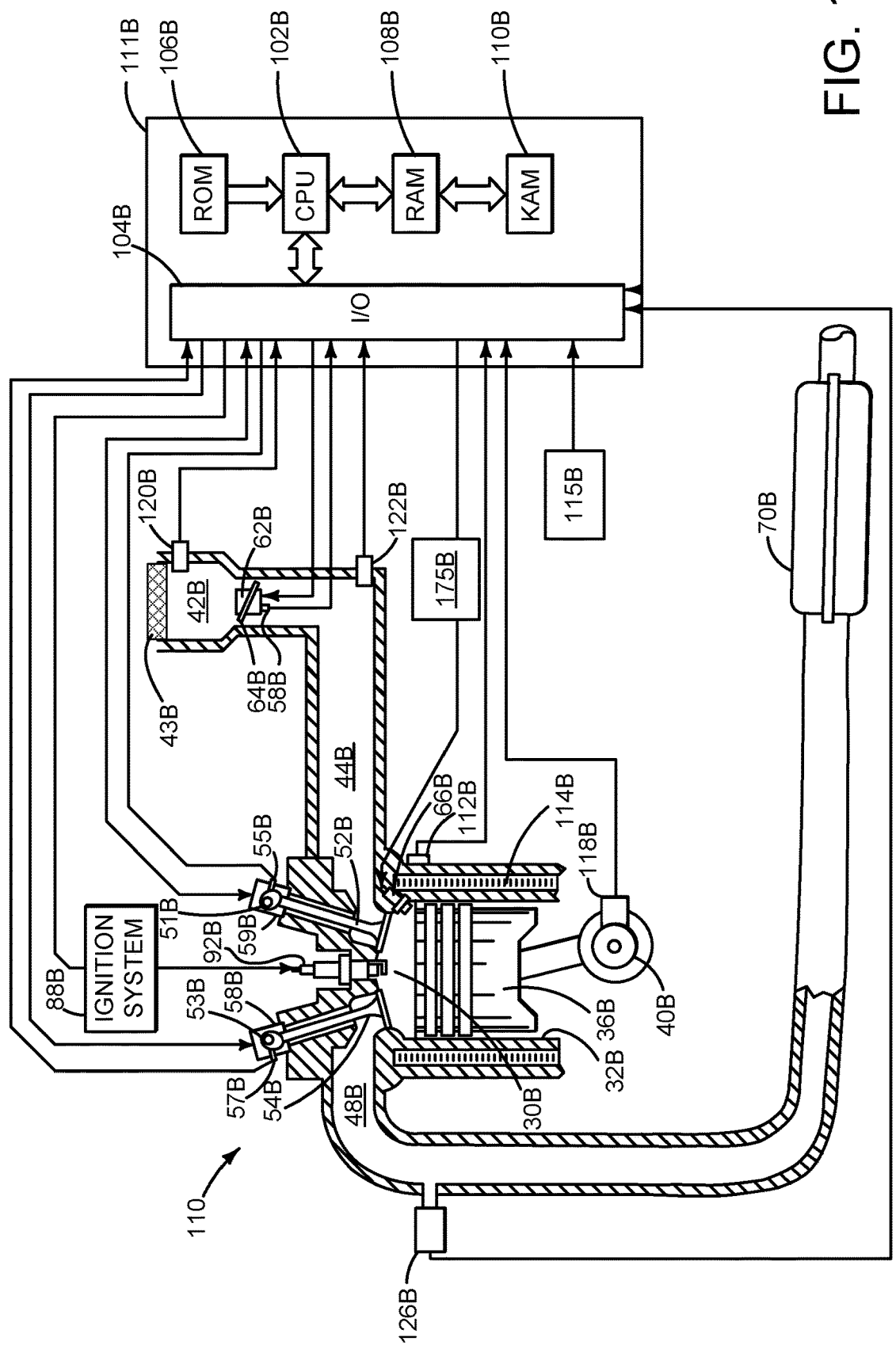
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
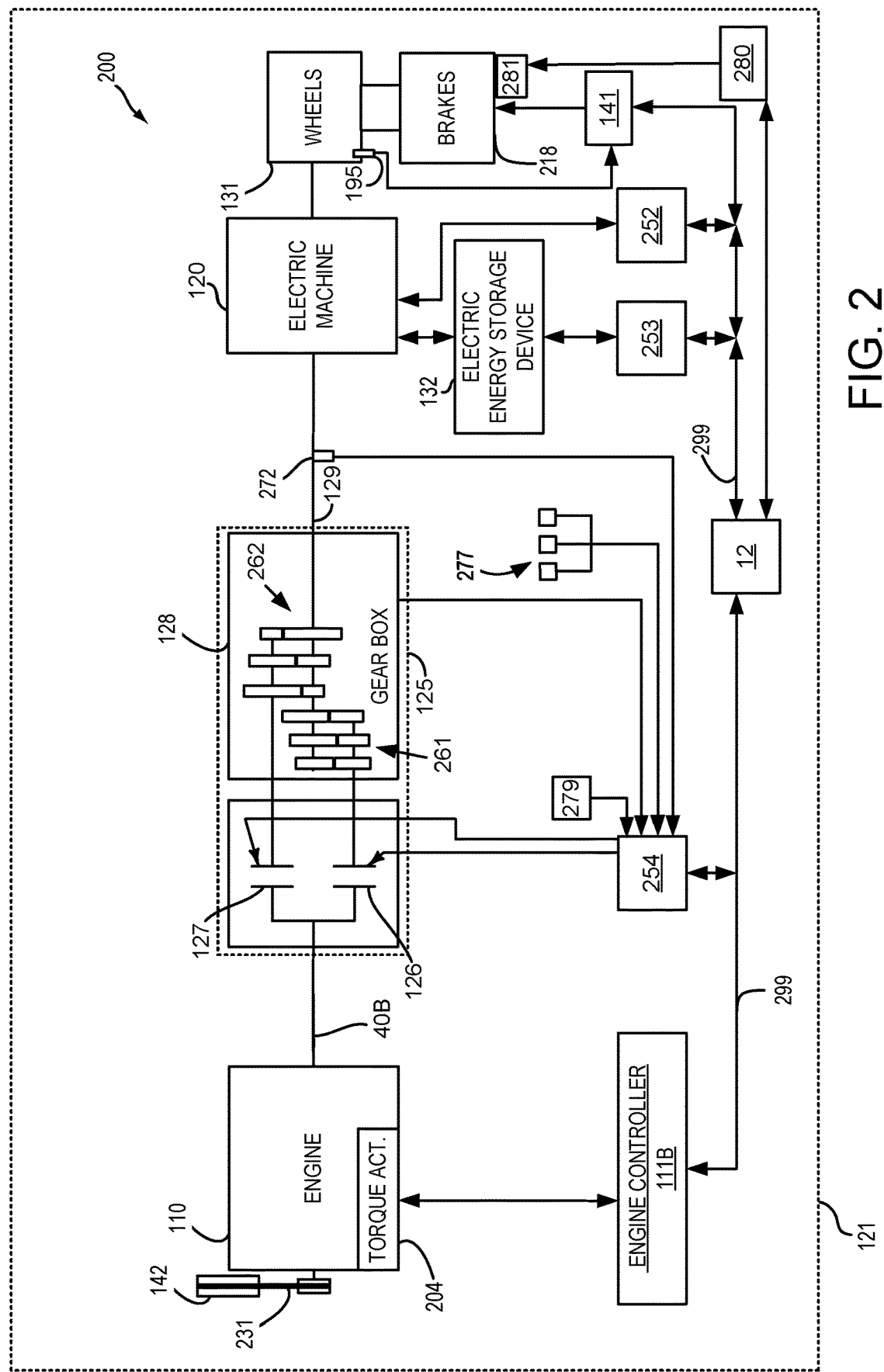
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft 40B or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125. In some examples, there are no other driveline clutches or disconnect devices other than those shown in FIG. 2. However, in other examples, additional clutches or disconnect devices may be added, if desired. As discussed above, selectively opening/closing first clutch 126 and/or second clutch 127 may comprise controlling an application pressure of a fluid to first clutch 126 and/or second clutch 127. In other words, first clutch 126 and second clutch 127 may be hydraulically actuated. Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, first input shaft speed sensor(s), second input shaft speed sensor(s), and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
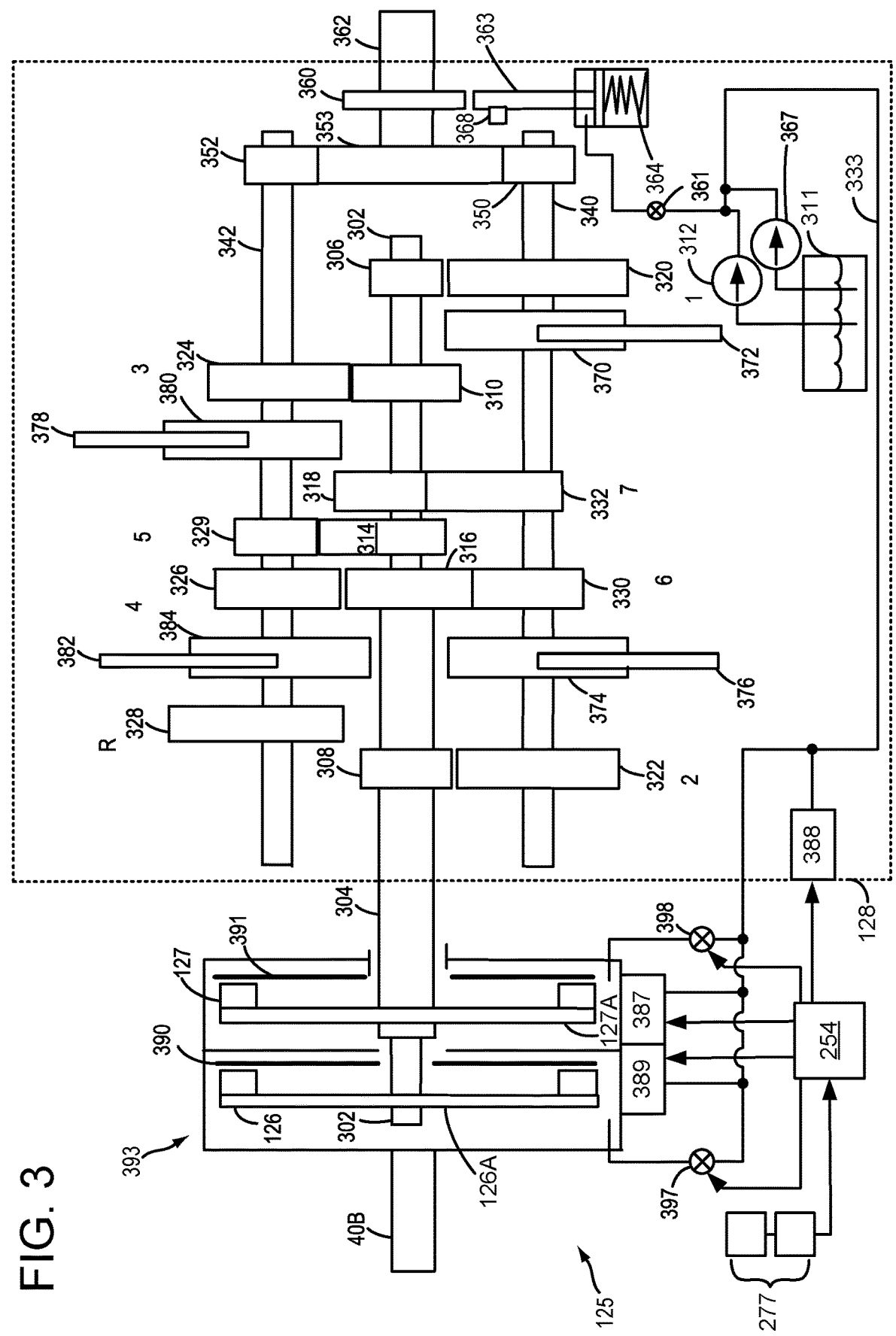
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift (selector) fork actuators may be operated electrically, hydraulically, or a combination of electric and hydraulic. Hydraulic power may be provided via pump 312 and/or pump 367. In other words, hydraulic power may be provided to control one or more shifting elements of the transmission, where the one or more shifting elements includes one or more selector fork actuators, and in some examples, one or more synchronizers. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

First clutch 126 may be cooled via fluid supplied via pump 312 and/or pump 367. Valve 397 may be opened to cool first clutch 126. First clutch 126 may be cooled at a rate that is significantly greater when first clutch is open and valve 397 is open since flow of fluid to first clutch 126 may be ten times greater than flow of fluid to first clutch 126 when first clutch 126 is closed. In this example, fluid flow to first clutch 126 is via conduit 333, which services valve 398 and other devices. However, in other examples, conduit 333 may be directly coupled to valve 397 to provide more precise fluid flow control. Similarly, second clutch 127 may be cooled via fluid supplied via pump 312 and/or pump 367. Valve 398 may be opened to cool second clutch 127. Second clutch 127 may be cooled at a rate that is significantly greater when second clutch is open and valve 398 is open since flow of fluid to second clutch 127 may be ten times greater than flow of fluid to second clutch 127 when second clutch 127 is closed. In this example, fluid flow to second clutch 127 is via conduit 333, which services valve 398 and other devices. However, in other examples, conduit 333 may be directly coupled to valve 398 to provide more precise fluid flow control.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electrically driven transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanically driven pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

As discussed above, in certain circumstances there can be powertrain modes that may propel the vehicle, such as vehicle 121, using only the electric machine with the transmission input clutches (e.g. 126, 127) open, and where the engine is off. If, while the vehicle is being propelled via the electric machine and driver demand exceeds the propulsion capability of the electric machine, the engine may be started to deliver additional torque to the driveline. However, as the engine is starting from zero speed, it may take some time to start combustion and accelerate its inertia up to a particular speed to lock the appropriate input clutch. While the engine is accelerating up to the target speed, torque may not be transmitted to the driven wheels, which may result in a delay between the request for engine torque, and the engine transmitting torque to the wheels.

Accordingly, a system may comprise an engine including a crankshaft, an integrated starter/generator coupled to the engine, a dual clutch transmission coupled to the engine including a first target clutch, a second non-target clutch, a first target input shaft, and a second non-target input shaft, and an electric machine coupled to the dual clutch transmission downstream of the dual clutch transmission. The system may include a controller storing executable instructions in non-transitory memory that, when executed, cause the controller to start the engine via the integrated starter/generator responsive to a driveline torque request exceeding a capability of the electric machine, command the electric machine to an electric machine maximum limit/threshold, control the first target input shaft to a first target speed and control the second non-target input shaft to a second non-target speed (the first speed higher than the second speed, and transmit torque from the engine through the transmission via the second non-target input shaft by controlling the second non-target clutch while an engine speed is increasing to the first target speed.

The system may further comprise additional instructions to stop transmitting torque from the engine via the second non-target input shaft by commanding open the second non-target clutch, and commence transmitting torque from the engine through the transmission via the first target input shaft by controlling the first target clutch responsive to an indication that the engine speed is synchronized with the first target speed.

The system may further comprise additional instructions to preselect a speed of either or both of the first target input shaft and the second non-target input shaft while the vehicle is being propelled solely via the electric machine.

The system may further comprise additional instructions to control a capacity of the second non-target clutch while the engine speed is increasing to the first target speed to enable the engine to increase to the first target speed in a predetermined amount of time.

The system may further comprise additional instructions to control the engine in a speed mode of operation to increase engine speed to the first target speed.

Turning to FIG. 4, an example timeline 400 is shown, illustrating a delay between a request for engine torque, and the engine transmitting torque to the wheels. Timeline 400 includes plot 405 indicating RPM of a vehicle engine (e.g. 110), plot 410, indicating RPM of a dual clutch transmission odd gear input shaft (e.g. 302), and plot 415, indicating RPM of a dual clutch transmission even gear input shaft (e.g. 304), over time. Timeline 400 further includes plot 420, indicating an engine (e.g. 110) torque, plot 425, indicating ISG (e.g. 142) torque, plot 430, indicating a dual clutch transmission odd gear clutch torque, plot 435, indicating a dual clutch transmission even gear clutch torque, and plot 440, indicating electric machine (e.g. 120) torque, over time. Timeline 400 further includes plot 445, indicating vehicle acceleration (m/s/s), over time.

At time t0, the vehicle is traveling via torque from the electric machine only, illustrated by plot 440. The engine is off, illustrated by plots 405 and 420. The transmission input clutches (e.g. 126, 127) are open, however the transmission has preselected a first gear (e.g. 320) on the odd shaft (e.g.

302), and a sixth gear (e.g. 330), on the even shaft (e.g. 304). Thus, RPM of the odd shaft is greater than the RPM of the even shaft.

At time t1, the vehicle operator tips-in to a maximum accelerator pedal (e.g. 192) position, thus requesting maximum vehicle performance. Accordingly, between time t1 and t2, the engine is started using the ISG, indicated by plot 425, and engine RPM increases, illustrated by plot 405. Furthermore, electric machine (e.g. 120) torque is increased to a maximum limit (e.g. limit not to be exceeded) to provide maximum electric performance, illustrated by plot 440. Accordingly, the vehicle accelerates between time t1 and t2, indicated by plot 445.

Between time t2 and t3, engine torque, illustrated by plot 420, is utilized to match engine speed, illustrated by plot 405, with the first gear odd input shaft speed, illustrated by plot 410. Furthermore, between time t2 and t3, there is a plateau in vehicle acceleration, illustrated by plot 445. The plateau may be due to the electric machine torque being saturated at its upper limit/threshold, and where the engine speed is not high enough to connect to the transmission, for example via odd input shaft clutch (e.g. 126). The plateau may include the parameter (acceleration in this example) being maintained and/or not varying by more than 5% over a selected duration.

At time t3, engine speed, illustrated by plot 405 is indicated to match the speed of the dual clutch transmission odd gear input shaft (e.g. 302), illustrated by plot 410. Accordingly, the first gear input clutch may be commanded to lock (e.g. close) responsive to the speeds being synchronized. More specifically, engine speed being synchronized with the speed of the dual clutch transmission odd gear input shaft may comprise speeds within 5% of each other or less. With the first gear input clutch locked, or commanded closed, engine torque may be transmitted to the driveline through the dual clutch transmission (e.g. 125). Thus, between time t3 and t4, odd gear clutch torque is indicated to increase, indicated by plot 430. More specifically, by closing the odd gear clutch, engine torque may be transmitted to the driven wheels via the odd input shaft, resulting in vehicle acceleration, illustrated by plot 445.

As discussed, such a process may result in a significant plateau in vehicle acceleration while the electric machine is saturated at its maximum torque limit/threshold, and while the engine is not at a high enough speed to connect to the transmission input shaft at the target gear. Engaging the target gear's input clutch earlier may result in a reduction in vehicle acceleration, as driveline torque would be used to accelerate the engine inertia. In some examples, the plateau may be reduced or eliminated via slowing down the application rate of the electric machine (e.g. 120) motor torque such that it does not reach its maximum torque until the engine is connected. However, while such an action may reduce or eliminate the vehicle acceleration plateau, the plateau would be reduced or eliminated at the expense of lowering the average acceleration across the engine start event, thus reducing overall performance. Thus, a method for reducing or eliminating the acceleration plateau is desired.

Turning now to FIG. 5, a high-level example method 500 for reducing the delay, or acceleration plateau, between a request for engine torque, and the engine transmitting torque to the driven wheels, is shown. More specifically, the method may include propelling a vehicle solely via an electric machine while an engine of the vehicle is not connected to a dual clutch transmission, the electric machine positioned in the driveline downstream of a dual clutch transmission. Discussed herein, propelling the vehicle solely via the electric machine may comprise conditions where the electric machine has torque capacity to meet a wheel torque demand, for example.

Responsive to a driveline torque request exceeding a capability of the electric machine, the engine may be started from rest, to deliver additional torque to the driveline. In such an example, the method may include controlling a first input shaft of the dual clutch transmission to a first speed (e.g. target speed) via selecting a first gear, controlling a second input shaft of the dual clutch transmission to a second speed (e.g. non-target speed) via selecting a second gear, where the first speed is higher than the second speed, and transmitting torque to one or more driven wheels of a vehicle via the engine by connecting an engine crankshaft to the second input shaft via a second clutch while the engine is increasing speed to the first speed. Thus, the acceleration plateau may be reduced or eliminated by transmitting positive torque through the transmission to the driveline via a lower gear ratio input shaft (e.g. second input shaft), while the engine speed is running up to the target (e.g. first input shaft) speed.

Discussed herein, it may be understood that "connecting" an engine crankshaft to either the first input shaft or the second input shaft may comprise commanding a capacity of either the first clutch or the second clutch, respectively, such that engine torque is transferred to the transmission. In other words, "connecting" an engine crankshaft to either the first input shaft or the second input shaft may comprise closing either the first clutch or the second clutch, such that engine torque is transferred to the transmission. In some examples, "connecting" may comprise a slipping clutch, whereas in other examples, connecting may comprise a clutch that is not slipping. Discussed herein, a slipping clutch may also be referred to as "partially connecting" the engine crankshaft to either the first input shaft or the second input shaft. Furthermore, it may be understood that "fully disconnecting" an engine crankshaft from either the first input shaft or the second input shaft may comprise commanding open either the first input clutch or the second input clutch, such that no engine torque is transferred to the first input shaft, or the second input shaft, respectively. Furthermore, discussed herein, "not connected" when utilized as above in terms of "while an engine of the vehicle is not connected to a dual clutch transmission" may comprise a situation where both the first input clutch and the second input clutch are open, such that no engine torque may be transferred to either the first input shaft or the second input shaft. For example, method 500 may comprise fully disconnecting the engine crankshaft from the second input shaft and connecting the engine crankshaft to the first input shaft responsive to engine speed being synchronized with the first, or target, speed.

In one example, method 500 may comprise pre-selecting the first gear and the second gear while the vehicle is being propelled solely via the electric machine. In another example, method 500 may comprise shifting one or more gears of the dual clutch transmission to select the first gear and the second gear responsive to the driveline torque request exceeding the capability of the electric machine, discussed in greater detail below.

Method 500 will be described with reference to the systems described herein and shown in FIGS. 1A-3, though it should be understood that similar methods may be applied to other systems without departing from the scope of this disclosure. Method 500 may be carried out by a controller, such as controller 12 in FIG. 1A, and may be stored at the controller as executable instructions in non-transitory memory. Instructions for carrying out method 500 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as ISG (e.g. 142), electric machine (e.g. 120), selector forks (e.g. 372, 376, 378, 382), first clutch (e.g. 126), second clutch (e.g. 127), etc., according to the method depicted below.

Method 500 begins at 505 and includes indicating whether a drivetrain torque request exceeds electric machine (e.g. 120) capability while the vehicle is traveling in an electric-only mode of vehicle propulsion. More specifically, exceeding electric machine capability may refer to exceeding a torque capability of the electric machine, for example. Such an indication may include an accelerator pedal position greater than a threshold, for example. Such an indication may in some examples be further based on limits of the onboard energy storage device (e.g. 132). If, at 505, drivetrain torque request is not indicated to exceed the capability of the electric machine, method 500 may proceed to 510. At 510, method 500 may include maintaining current vehicle operating conditions. For example, maintaining current vehicle operating conditions at 510 may include maintaining the engine off, and may further include maintaining propelling the vehicle solely via the electric machine.

Returning to 505, responsive to an indication that drivetrain torque request exceeds the capability of the electric machine (e.g. 120), method 500 may proceed to 515. At 515, method 500 may include commanding an engine start, and may further include commanding a gear shift on an appropriate input shaft to a target gear (e.g. appropriate target gear ratio). More specifically, the engine start may be initiated via the ISG (e.g. 142), and the target gear may be selected by the controller commanding an appropriate selector fork to lock the target gear. The target gear may be determined as a function of an amount by which driveline torque requested exceeds the capability of the electric machine. Furthermore, while not explicitly illustrated, in some examples method 500 may include additionally selecting a non-target gear, with a resultant lower input shaft speed than that of the target gear input shaft speed. As an example, the target gear may comprise a first gear (e.g. 320), while the non-target gear may comprise a sixth gear (e.g. 330). Importantly, it may be understood that the target gear may comprise a gear corresponding to one input shaft (e.g. first input shaft), and the non-target gear may comprise a gear corresponding to the other input shaft (e.g. second input shaft). Furthermore, it may be understood that the target gear may correspond to an input shaft speed greater than the speed of the input shaft corresponding to the non-target gear.

Step 515 is illustrated as a dashed box, because in some examples, no shifting of gears may be conducted at step 515. For example, the target gear may already be pre-selected, and in some examples the non-target gear may additionally already be pre-selected. Strategies for preselecting one or both of the target gear and non-target gear while the vehicle is operating in an electric-only mode, will be described in detail below with regard to the methods depicted at FIGS. 7-9, and FIG. 12. In an example where shifting to the target gear and non-target gear is not conducted, the result of the target gear and non-target gear being preselected, only the engine cranking via the ISG may be carried out at 515. In other examples, only shifting to the target gear, and not to the non-target gear may be carried out at 515, in addition to cranking the engine. In still other examples, only shifting to the non-target gear, and not to the target gear, may be carried out at 515, in addition to cranking the engine. Such examples will be further discussed below with regard to FIGS. 7-9, and FIG. 12.

Proceeding to 518, method 500 may include indicating whether crankshaft speed is greater than the speed of the low speed input shaft. Responsive to an indication that crankshaft speed is greater than the speed of the low speed input shaft, method 500 may proceed to 520.

Proceeding to 520, method 500 may include applying clutch torque to the low speed input shaft. For example, if the target gear comprises first gear, and the non-target gear comprises sixth gear, then at 520, method 500 may include applying clutch torque to the low speed input shaft corresponding to the sixth gear. More specifically, second clutch (e.g. 127) torque may be applied to the low speed input shaft (e.g. 304). It may be understood that the clutch torque applied to the low speed input shaft may be controlled so that the clutch is not commanded to carry more capacity than it is capable of achieving with reduced line pressure available during an engine start. Furthermore, the rate at which the transient clutch torque is applied, as well as the peak clutch torque, may be limited to maintain enough engine torque capability to supply both the clutch torque and inertia torque to accelerate the crankshaft to the target gear input shaft speed in a desired amount of time.

As one example, clutch torque to the non-target, low speed input shaft may be applied linearly up to a predetermined peak value, at a rate that is slower than the rate at which the engine can produce increasing torque to avoid putting more load torque on the crankshaft through the clutch than the engine is producing. In this way, sufficient crankshaft inertia torque may be preserved, to meet a desired minimum engine acceleration performance. In another example, clutch torque may be integrated with crankshaft speed control as a secondary actuator to improve engine and clutch torque coordination. Such an example will be discussed in further detail with regard to FIG. 10. In still another example, clutch torque may be applied in parallel with engine speed control to achieve the desired behavior. Such an example will be discussed in further detail with regard to FIG. 11.

By applying clutch torque to the low speed input shaft, the engine may transmit positive torque through the transmission before the engine has reached its target speed. Because the torque is going through the lower gear ratio, there may not be significant torque delivered to the wheels to accelerate the vehicle, yet there may be enough torque to prevent the acceleration plateau and get the transmission, driveshaft, and differential through lash to enable faster torque application through the target gear ratio when the speeds are synchronized.

There may be a practical limit to how quickly torque from the engine may be applied to the lower gear ratio (low speed) input shaft. At low vehicle speeds, selecting the lowest gear ratio may allow the input clutch to accept positive torque from the engine at extremely low engine speeds. In such a case, the clutch on the low gear input shaft may never be fully engaged (e.g. always slipping), so torque can be transiently transmitted through the transmission during engine starting as long as the engine is running. However, to ensure the engine starts properly, torque capacity may in some examples not be commanded to the low speed input shaft until stable engine combustion is confirmed. For example, a minimum engine speed may be one criteria for confirming engine combustion (in addition to rapid engine acceleration). At very low vehicle speeds, there may be one or more gears which may be capable of spinning at an input speed less than the minimum engine combustion speed. In such a situation, the method may include waiting for the engine to report that it is running normally, and then the method may include selecting the highest gear ratio that puts the transmission input speed below crankshaft speed, giving the highest torque multiplication through the transmission while the engine is running up to the speed of the target gear input shaft.

Proceeding to 525, method 500 may include indicating whether crankshaft speed is synchronized with the target gear input shaft speed. As an example, indicating whether crankshaft speed is synchronized with the target gear input shaft speed may comprise an indication of crankshaft speed and target gear input shaft speed within a threshold speed difference (e.g. a speed difference of 5% or less) of each other. Such an indication may be provided via a Hall effect sensor (e.g. 118B) sensing crankshaft position, and target input shaft speed sensor(s) (e.g. 277). Responsive to an indication that crankshaft speed is not yet synchronized with the target input shaft speed, method 500 may continue applying clutch torque to the low speed (non-target) input shaft while the engine is running up to the speed of the target input shaft speed.

Alternatively, responsive to an indication that the crankshaft speed is synchronized with the target gear input shaft speed, method 500 may proceed to 530, and may include applying target gear input shaft clutch torque to the target input shaft, to connect the engine crankshaft to the target gear input shaft. As an example, responsive to the target gear comprising a first gear (e.g. 320), clutch torque may be applied to a first clutch (e.g. 126). In other words, at 530, method 500 may include locking the target gear input clutch responsive to the crankshaft speed being indicated to be synchronized with the target gear input shaft speed. More specifically, at 530, locking the target gear input clutch may comprise fully closing the target gear input clutch. In an example where the target gear input clutch is fully closed, or locked, it may be understood that the engine may be fully coupled, or connected, to the driveline of the vehicle (e.g. no clutch slippage).

Proceeding to 535, method 500 may include increasing engine torque, and blending off the slipping low speed (non-target) input shaft clutch torque capacity to transfer all of the engine torque to the target input shaft. In other words, at 535, method 500 may include reducing the low speed input shaft clutch torque capacity to zero (e.g. fully disconnecting the low speed input shaft clutch), such that all engine torque is transferred to the transmission via the target input shaft, with no engine torque being transferred to the transmission via the non-target input shaft. Thus, with no engine torque being transferred to the transmission via the non-target input shaft, it may be understood that the engine may be fully disconnected from the non-target input shaft of the transmission.

Accordingly, it may be understood that method 500 may include fully disconnecting the engine crankshaft from the non-target input shaft, and connecting the engine crankshaft to the target input shaft responsive to engine speed being synchronized with the target gear input shaft speed. It may be further understood that connecting the engine to the target input shaft may be accomplished via a target gear input shaft clutch, and wherein connecting and fully disconnecting the engine crankshaft from the non-target input shaft may be accomplished via a non-target gear input shaft clutch.

Proceeding to 540, method 500 may include adjusting engine and electric machine (e.g. 120), torque to achieve a requested total driveline torque. For example, the total driveline torque request may be a function of driver demanded wheel torque, vehicle speed, electric machine power limits, etc. Method 500 may then end.

Turning now to FIG. 6, an example timeline 600 is shown, illustrating an avoidance of a delay between a request for engine torque, and the engine transmitting torque to driven wheels, according to the method of FIG. 5. Timeline 600 includes plot 605 indicating RPM of a vehicle engine (e.g. 110), plot 610, indicating RPM of a dual clutch transmission odd gear input shaft (e.g. 302), and plot 615, indicating RPM of a dual clutch transmission even gear input shaft (e.g. 304), over time. Timeline 600 further includes plot 620, indicating an engine (e.g. 110) torque, plot 625, indicating ISG (e.g. 142) torque, plot 630, indicating a dual clutch transmission odd gear clutch torque, plot 635, indicating a dual clutch transmission even gear clutch torque, and plot 640, indicating electric machine (e.g. 120) torque, over time. Timeline 600 further includes plot 645, indicating vehicle acceleration (m/s/s), over time.

At time t0, the vehicle is traveling via torque from the electric machine only, illustrated by plot 640. The engine is off, illustrated by plots 605 and 620. The transmission input clutches (e.g. 126, 127) are open, however the transmission has preselected a first gear (e.g. 320) on the odd shaft (e.g. 302), and a sixth gear (e.g. 330), on the even shaft (e.g. 304). Thus, RPM of the odd shaft is greater than the RPM of the even shaft.

At time t1, the vehicle operator tips-in to a maximum accelerator pedal (e.g. 192) position, thus requesting maximum vehicle performance. Accordingly, between time t1 and t2, the engine is started using the ISG, indicated by plot 625, and engine RPM increases, illustrated by plot 605. Furthermore, electric machine (e.g. 120) torque is increased to a maximum limit/threshold to provide maximum electric performance, illustrated by plot 640. Accordingly, the vehicle accelerates between time t1 and t2, indicated by plot 645.

Between time t2 and t3, engine torque, illustrated by plot 620, is controlled to match engine speed, illustrated by plot 605, with the first gear (or target gear) input shaft speed, illustrated by plot 610. Furthermore, the clutch (e.g. second clutch 127) corresponding to the sixth gear (or non-target gear) is actuated to carry an amount of increasing slipping torque capacity responsive to engine speed being high enough to contribute positive torque to the driveline through the transmission. For example, engine speed being high enough to contribute positive torque to the driveline through the transmission may comprise a minimum engine speed indicating stable combustion. By actuating the clutch (e.g. closing the clutch) corresponding to the non-target input shaft to transfer positive torque to the drive line, no plateau in vehicle acceleration is indicated between time t2 and t3, illustrated by plot 645.

At time t3, engine speed, indicated by plot 605 (and thus crankshaft speed), is indicated to be synchronized with the target (first gear) input shaft speed, illustrated by plot 610. Accordingly, the target gear input clutch (e.g. first clutch 126) may be commanded to lock (e.g. close) responsive to the speeds being synchronized. With the target gear input clutch locked, or commanded closed, engine torque may be transmitted to the driven wheels through the dual clutch transmission (e.g. 125). Accordingly, target gear (first gear) clutch torque is indicated to increase, indicating by plot 630. Furthermore, the non-target (sixth gear) input clutch torque is reduced to zero torque between time t3 and t4, illustrated by plot 635, such that engine torque is no longer being transmitted to the driveline via the non-target input shaft. In other words, a capacity of the second clutch (e.g. 127) corresponding to the non-target input shaft may be blended off, or opened, thus disconnecting the engine from the driveline via the non-target input shaft.

Thus, at time t4, with clutch capacity to the non-target input shaft reduced to zero torque, all of the engine torque is being transmitted to the driveline via the target input shaft (e.g. 302). With engine torque being transmitted to the driveline via the target input shaft, the vehicle accelerates between time t4 and t5, as a function of driver demand.

Accordingly, by using the dual clutch transmission to select two different input shaft speeds during an engine start, with one shaft at the desired target speed, and the other at a non-target speed (e.g. lower than the target speed), transient engine torque may be applied to the driven wheels via clutch capacity through the low speed (non-target) input shaft while the engine is controlling speed to synchronize with the target input shaft speed. Such a methodology may result in an avoidance of a vehicle acceleration plateau which may otherwise result responsive to a driver demanded wheel torque that exceeds a capability of an electric machine (e.g. 120).

Furthermore, another benefit of such a strategy is that the strategy may utilize more of the engine's torque production capability. For example, when the engine is in speed control alone, as illustrated in the timeline depicted at FIG. 4, it may not produce significant torque as it approaches its target speed because it has to slow the crankshaft acceleration to synchronize with the input shaft speed. More specifically, at FIG. 4, engine torque, illustrated by plot 420, is reduced nearly to zero torque in order to synchronize engine speed with the target input shaft speed at around time t3. Alternatively, reduction in engine torque may be significantly reduced to synchronize engine speed with the target input shaft speed when method 500 is utilized, as indicated around time t3 in timeline 600 depicted at FIG. 6. More specifically, as illustrated at FIG. 6, the non-target input shaft clutch torque is increased as time passes, illustrated by plot 635 between time t2 and t3, giving the engine most of its torque capability to increase crankshaft speed up to the target speed initially. As the crankshaft speed approaches the target shaft speed, very little engine torque may be utilized for speed regulation, and its excess torque capability may be put into increasing the torque transmitted to the non-target input shaft (non-target gear ratio) through the slipping clutch. Because the engine may be making significant torque at the time of connection to the target input shaft, the engine may be able to increase torque more quickly up to its maximum value, and more torque may be instantly applied to the target gear input shaft as the lower speed (non-target) input shaft clutch torque is blended off. The result may be a higher peak acceleration which may be achieved quickly with no plateau in vehicle acceleration.

While the example timeline indicated at FIG. 6 illustrates an example where both the target gear and the non-target gear are selected prior to the driver demanded wheel torque exceeding the capability of the electric machine, as discussed above at FIG. 5, there may be some examples where shifting to either or both of the target and non-target gear may be conducted responsive to driver demand exceeding electric machine capability. In other examples, either or both the target gear and non-target gear may be preselected while the vehicle is operating in electric-only mode, to prepare the transmission input shafts for the engine start procedure depicted at FIG. 5. Such examples will be discussed below with regard to FIGS. 7-10.

Turning now to FIG. 7, a high-level example method 700 for selecting gears on both a first input shaft (e.g. 302) and second input shaft (e.g. 304) while a vehicle is operating in an electric-only mode of operation, is shown. Method 700 will be described with reference to the systems described herein and shown in FIGS. 1A-3, though it should be understood that similar methods may be applied to other systems without departing from the scope of this disclosure. Method 700 may be carried out by a controller, such as controller 12 in FIG. 1A, and may be stored at the controller as executable instructions in non-transitory memory. Instructions for carrying out method 700 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), etc., according to the method depicted below.

Method 700 begins at 705 and may include indicating whether the vehicle is being operated solely in an electric mode of operation. In some examples, a vehicle may be operating in an electric-only mode of operation responsive to an idle stop event, where the engine is deactivated. Other examples may include situations where the vehicle is being propelled solely via the electric machine (e.g. 120). Such an indication may include an indication that the vehicle is being operated via an electric machine (e.g. 120), while the engine (e.g. 110) is indicated to be off, and not combusting fuel. Responsive to an indication that the vehicle is not being operated solely via the electric-only mode of operation, method 700 may proceed to 710, and may include maintaining current vehicle operating conditions. For example, if the engine is in operation, maintaining current vehicle operating conditions may include maintaining fuel injection and maintaining providing spark to the engine. Responsive to the electric machine additionally being indicated to be operating, electric machine operation may be continued. Method 700 may then end.

Returning to 705, responsive to an indication that the vehicle is being operated solely in an electric mode of operation, method 700 may proceed to 715. At 715, method 700 may include selecting gears with the lowest available speed ratios for both the first input shaft (e.g. 302) and second input shaft (e.g. 304). As an example, a sixth gear (e.g. 330), and a seventh gear (e.g. 332) may be selected responsive to an indication that the vehicle is operating solely in an electric mode of operation. More specifically, responsive to the indication that the vehicle is operating in the electric mode, one or more selector forks may be commanded to select, or lock, the gears with the lowest available speed ratios, for example the sixth gear and the seventh gear. Keeping the transmission locked in lower gear ratios may keep both input shafts spinning while the vehicle is moving, may ensure that the system will not overspeed transmission components, and may improve a time to shift the target gear shaft up to a connection speed dictated by driver demand responsive to a driver demand exceeding the electric machine capability. Additionally, the lower gear ratios may minimize electric propulsion torque lost to accelerating their inertia as the vehicle accelerates in electric vehicle mode.

With the gears with the lowest available speed ratios selected corresponding to each input shaft, method 700 may proceed to method 500 depicted at FIG. 5. In the interest of brevity, the entirety of method 500 will not be reiterated here. However, it may be understood that, with the lowest available gear ratios selected while the vehicle is operating in electric mode, responsive to drivetrain torque request at 505 exceeding electric machine (e.g. 120) capability, one input shaft may be shifted to a higher speed for a target gear at step 515, while the engine is accelerating and transmitting torque to the driveline through the other, non-target, lower speed input shaft. In such an example, the additional engine torque and increasing electric machine torque at the time of increased drivetrain torque request may compensate for the torque to increase the speed of the target shaft and prevent a decrease in vehicle acceleration resulting from the shift.

Furthermore, while the examples and description above with regard to FIG. 7 discuss shifting one input shaft to a higher speed for a target gear, while the engine is accelerating and transmitting torque to the driveline through the lower speed input shaft, it may be understood that in some examples, capacity may be only applied to the clutch associated with the target gear, and not to the non-target gear, in response to an engine pull-up event.

While the method of FIG. 7 preselects gears with the lowest available gear ratios while the vehicle is operating in the electric mode of operation, another option may be to have an algorithm that may predict a target gear when a driver demand exceeds a capability of the electric machine. Such an example may include keeping both input shafts locked in higher gear ratios so that one input shaft will be at the target speed with the engine start is demanded. Such an example may further include always maintaining both input shafts in adjacent gear ratios, such that alternating shafts may take turns shifting to change a target gear range, thus minimizing a total number of gear shifts while the vehicle is being operated in electric mode. In such an example, at the time of engine start, the non-target gear may be shifted to an appropriate non-target, or low gear ratio, such that the clutch may be applied to the non-target input shaft to transfer torque to the driveline while the engine is running up to the target speed. Such an example method will be discussed below with regard to FIG. 8.

Turning now to FIG. 8, a high-level example method 800 is shown for predicting a target gear and engaging the target gear while the vehicle is operating in an electric-only mode of operation. More specifically, method 800 may be used to predict a target gear when a driver demand exceeds a capability of an electric machine, such that the transmission does not have to shift gears to the target gear subsequent to the driver demand exceeding the capability of the electric machine. Method 800 will be described with reference to the systems described herein and shown in FIGS. 1A-3, though it should be understood that similar methods may be applied to other systems without departing from the scope of this disclosure. Method 800 may be carried out by a controller, such as controller 12 in FIG. 1A, and may be stored at the controller as executable instructions in non-transitory memory. Instructions for carrying out method 800 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), etc., according to the method depicted below.

Method 800 begins at 805 and may include indicating whether the vehicle is being operated solely in an electric mode of operation. As discussed above, in some examples, a vehicle may be operating in an electric-only mode of operation responsive to an idle stop event, where the engine is deactivated. Other examples may include situations where a vehicle is being propelled solely via the electric machine (e.g. 120). Such an indication may include an indication that the vehicle is being operated via an electric machine (e.g. 120), while the engine (e.g. 110) is indicated to be off, and not combusting fuel. Furthermore, while not explicitly illustrated, for method 800, if the vehicle is stopped, but where the vehicle is being operated via electric-only operation, such as an idle-stop event, method 800 may include commanding a first gear (e.g. 320) and a second gear (e.g. 322) engaged.

Responsive to an indication that the vehicle is not being operated solely via the electric-only mode of operation, method 800 may proceed to 810, and may include maintaining current vehicle operating conditions. For example, if the engine is in operation, maintaining current vehicle operating conditions may include maintaining fuel injection and maintaining providing spark to the engine. Responsive to the electric machine additionally being indicated to be operating, electric machine operation may be continued. Method 800 may then end.

Returning to 805, responsive to an indication that the vehicle is being operated solely in an electric mode of operation, method 800 may proceed to 815. At 815, method 800 may include determining an accelerator position that may result in an engine pull-up. More specifically, at 815, method 800 may include determining an accelerator pedal position that may exceed the capacity of an electric machine (e.g. 120), such that in order to provide the driver demanded wheel torque, the engine may be activated, or pulled-up.

As an example, determining accelerator pedal position which would result in an engine pull-up at 815 may include determining or indicating a capacity of the electric machine, and determining an accelerator pedal position for which driver demanded wheel torque may exceed the ability of the electric machine to provide the driver demanded wheel torque. In some examples, such an indication may be a function of a charge state of an onboard energy storage device (e.g. 132). In some examples, such an indication may further be a function of current vehicle speed. As one example, the vehicle controller may include a lookup table that may enable an accurate indication of accelerator pedal position that may result in driver demand exceeding the capability of the electric machine.

With accelerator pedal position that may result in an engine pull-up determined at 815, method 800 may proceed to 820, and may include determining a target gear for current vehicle speed and accelerator pedal position that may result in an engine pull-up event. For example, as discussed above, if the vehicle is stationary, such as during an idle stop event, both the first gear and the second gear may be engaged via the appropriate synchronizers (e.g. 370, 374, respectively). Alternatively, if the vehicle is being propelled solely via the electric machine at non-zero speeds, then at 820, method 800 may include determining which target gear may be most appropriate to engage as a function of current vehicle speed and the indicated pedal position that may result in an engine pull-up. As one example, the most appropriate target gear may be indicated or obtained via a lookup table stored at the vehicle controller, where the lookup table may enable the most appropriate target gear to be determined as a function of vehicle speed and accelerator pedal position that may result in an engine pull-up.

Proceeding to 825, method 800 may include indicating whether the target gear indicated at step 820 is already engaged. For example, if the target gear is indicated to be second gear (e.g. 322), and second gear is already engaged by the appropriate synchronizer (e.g. 374), then method 800 may proceed to 835, and may include indicating whether driver demanded torque request exceeds the capability of the electric machine, as discussed above and which will be discussed in further detail below.

Returning to step 825, responsive to an indication that the target gear indicated at step 820 is not engaged, method 800 may proceed to 830 and may include commanding an appropriate synchronizer to engage the target gear. As discussed above, commanding the appropriate synchronizer to engage the target gear may comprise the controller commanding movement of the appropriate synchronizer via the appropriate selector fork, where the appropriate selector fork may be commanded to generate movement of the appropriate synchronizer via an appropriate shift fork, or selector fork, actuator (e.g. 388). It may be understood that, the target gear may continuously change while the vehicle is being operated with the engine off. Thus, there may be multiple shifting events to engage a target gear while the vehicle is operating in electric mode with the engine off.

Responsive to the appropriate synchronizer engaging the target gear at 830, method 800 may proceed to 835. At 835, method 800 may include indicating whether driver demanded torque request exceeds the capability of the electric machine. As discussed above, such an indication may include an accelerator pedal position greater than a threshold, where the threshold may include the pedal position determined at step 815 that may result in an engine pull-up. If, at 835, it is indicated that driver demanded torque request does not exceed the capability of the electric machine, method 800 may return to 815, and may include continuing to determine accelerator pedal position which may result in an engine pull-up. In this way, while the vehicle is operating in electric mode, accelerator pedal position that may result in a driver demanded torque that may exceed the capability of the electric machine may be continually updated. Furthermore, responsive to any changes in the accelerator pedal position which may result engine pull-up, the appropriate target gear may be continually updated and engaged, as discussed above.

While not explicitly illustrated, method 800 may include always maintaining both input shafts in adjacent gear ratios while the vehicle is operating in electric-only mode, regardless of the number of gear shifts that may take place prior to an engine pull-up event. As an example, consider a vehicle that is stopped, and where electric-only vehicle propulsion is utilized to propel the vehicle forward upon release of a brake pedal (e.g. 156). In such an example, both first and second gears may initially be engaged while the vehicle is stopped, as discussed above. While the vehicle is traveling in electric-only mode, it may be determined that the target gear has become third gear, based on accelerator pedal position that may result in an engine pull-up, vehicle speed, etc. In such an example, an appropriate synchronizer may be commanded to engage the third gear, while the first gear may be disengaged, thus resulting in both the second and third gear being engaged. Subsequently, it may be determined that the fourth gear has become the target gear. In such an example, an appropriate synchronizer may be commanded to engage the fourth gear, while disengaging the second gear. In other words, both input shafts may always be maintained in adjacent gear ratios, to minimize the total number of gear shifts while the vehicle is being operated in electric mode. In another example, both input shafts may not always be maintained in adjacent gear ratios, but rather the target gear may be engaged and any most appropriate gear on the non-target input shaft may be additionally selected, or engaged.

If, at 835, it is indicated that driver demanded torque request exceeds the capability of the electric machine, method 800 may proceed to step 515 of method 500 depicted at FIG. 5, such that the rest of method 500 may be carried out. In the interest of brevity, the entirety of method 500 will not be reiterated here. However, it may be understood that, with the target gear engaged according to method 800 depicted at FIG. 8, and where both the target gear and non-target gear may be maintained engaged in adjacent gear ratios, responsive to drivetrain torque request exceeding electric machine capability, the non-target input shaft may be shifted to an appropriate non-target low gear ratio prior to applying clutch torque to the low speed input shaft. Thus, at step 515 of method 500, the method may include cranking the engine and shifting the non-target gear shaft to the appropriate low gear ratio. The energy stored in the decelerating input shaft inertia may contribute to both positive torque to the transmission output to accelerate the vehicle, and may contribute additional torque to start and accelerate the engine inertia. Responsive to the engine being started and the non-target gear shaft being shifted to the appropriate low gear ratio, method 500 may proceed as discussed above, such that an acceleration plateau, as shown in FIG. 4, may be avoided by transmitting positive torque through the non-target input shaft clutch while the engine is running up to the target speed as discussed above.

While the examples of methods 700 and 800 depicted above include preselecting gears with the lowest available speed ratios while the vehicle is operating in electric-only mode (method 700), or predicting a target gear while maintaining both target and non-target input shafts at adjacent gear ratios (method 800), another option will be discussed below with regard to the method depicted at FIG. 9. Briefly, such a method may include preselecting both the target gear and the gear for the low speed input shaft continuously, to try and mitigate any shifting at the time an engine start is requested.

Turning now to FIG. 9, a high-level example method 900 for predicting a target gear and pre-engaging both the target gear and a non-target gear while the vehicle is operating in an electric-only mode of operation, is shown. Method 900 will be described with reference to the systems described herein and shown in FIGS. 1A-3, though it should be understood that similar methods may be applied to other systems without departing from the scope of this disclosure. Method 900 may be carried out by a controller, such as controller 12 in FIG. 1A, and may be stored at the controller as executable instructions in non-transitory memory. Instructions for carrying out method 900 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), etc., according to the method depicted below.

Method 900 begins at 905 and may include indicating whether the vehicle is operating in an electric-only mode of operation. As discussed above, in some examples a vehicle may be operating in an electric-only mode of operation responsive to an idle stop event, where the engine is deactivated. Other examples may include situations where the vehicle is being propelled solely via the electric machine (e.g. 120). Such an indication may include an indication that the vehicle is being operated via an electric machine (e.g. 120), while the engine (e.g. 110) is indicated to be off, and not combusting fuel. Other examples may include the vehicle traveling at non-zero speed, where the vehicle is being propelled solely via the electric machine (e.g. 120). Responsive to an indication that the vehicle is not being operated solely via the electric-only mode of operation, method 900 may proceed to 910, and may include maintaining current vehicle operating conditions. For example, if the engine is in operation, maintaining current vehicle operating conditions may include maintaining fuel injection and maintaining providing spark to the engine. Responsive to the electric machine additionally being indicated to be operating, electric machine operation may be continued. Method 900 may then end.

Returning to 905, responsive to an indication that the vehicle is being operated solely in an electric mode of operation, method 900 may proceed to 915. At 915, method 900 may include determining an accelerator position that may result in an engine pull-up. More specifically, at 915, method 900 may include determining an accelerator pedal position that may exceed the capacity of an electric machine (e.g. 120), such that in order to provide the driver demanded wheel torque, the engine may be activated, or pulled-up.

As an example, determining accelerator pedal position which would result in an engine pull-up at 915 may include determining or indicating a capacity of the electric machine, and determining an accelerator pedal position for which driver demanded wheel torque may exceed the ability of the electric machine to provide the driver demanded wheel torque. In some examples, such an indication may be a function of a charge state of an onboard energy storage device (e.g. 132). In some examples, such an indication may further be a function of current vehicle speed. As one example, the vehicle controller may include a lookup table that may enable an accurate indication of accelerator pedal position that may result in driver demand exceeding the capability of the electric machine.

With accelerator pedal position that may result in an engine pull-up determined at 915, method 900 may proceed to 920, and may include determining a target gear for current vehicle speed and accelerator pedal position that may result in an engine pull-up event. As one example, the most appropriate target gear may be indicated or obtained via a lookup table stored at the vehicle controller, where the lookup table may enable the most appropriate target gear to be determined as a function of vehicle speed and accelerator pedal position that may result in an engine pull-up.

Proceeding to 925, method 900 may include indicating whether the target gear indicated at step 920 is already engaged, and may further include indicating whether a lowest practical gear ratio is engaged on the non-target input shaft. For example, if the target gear is indicated to be second gear (e.g. 322), and second gear is already engaged by the appropriate synchronizer (e.g. 374), and the lowest practical gear on the non-target input shaft is already engaged by the appropriate synchronizer, then method 900 may proceed to 935, and may include indicating whether driver demanded torque request exceeds the capability of the electric machine, as discussed above.

Returning to step 925, responsive to an indication that the target gear indicated at step 920 is not engaged, method 900 may proceed to 930 and may include commanding an appropriate synchronizer to engage the target gear on one input shaft, and may further include simultaneously commanding an appropriate synchronizer to engage a lowest gear ratio that enables the engine to connect to the transmission, on the other non-target input shaft. Such a strategy may be advantageous in that it would ideally have both the optimal target gear and the lowest practical gear ratio on the non-target input shaft preselected before the engine start is commanded. However, such a strategy may result in shifting gears corresponding to both input shafts every time the current vehicle conditions indicate a change in the target gear ratio, as the current target gear may thus be commanded to the lowest practical gear for that shaft, while the other shaft may be shifted from its lowest ratio up to the new target speed. In such a case, the inertia of the two shafts may at least partially balance each other to reduce any torque lost from the driveline during the shift, however in some cases any torque lost from the driveline during the shift may be compensated for by utilizing motor torque from the electric machine (e.g. 120), to provide a smooth shift.

Responsive to the target gear and non-target gear being indicated to be engaged via the appropriate synchronizers, which may be accomplished via the controller commanding movement of the appropriate synchronizers via appropriate corresponding selector forks, which may be actuated by an appropriate shift fork, or selector fork, actuator (e.g. 388), method 900 may proceed to 935, and may include indicating whether driver demanded torque request exceeds the capability of the electric machine, as discussed above.

If, at 935, it is indicated that driver demanded torque request exceeds the capability of the electric machine, method 900 may proceed to step 515 of method 500 depicted at FIG. 5, such that the rest of method 500 may be carried out. In the interest of brevity, the entirety of method 500 will not be reiterated here. However, it may be understood that, with both the target gear engaged on the target input shaft, and the lowest gear ratio engaged on the non-target shaft, no shifting may occur responsive to driveline torque request exceeding electric machine capability. Thus, at step 515 of method 500, the method may include cranking the engine and may further include maintaining the target gear engaged on the target input shaft and maintaining the non-target gear engaged on the non-target input shaft, without any shifting. Method 500 may then proceed as discussed above, such that an acceleration plateau, as shown in FIG. 4, may be avoided by transmitting positive torque through the non-target input shaft clutch while the engine is running up to the target speed as discussed above.

As discussed above at FIG. 5 with regard to step 520 of method 500, application of clutch torque to the low speed input shaft may be controlled so that the clutch is not commanded to carry more capacity than it is capable of achieving with reduced line pressure available during an engine start. Additionally, as discussed, the rate at which transient clutch torque is applied, as well as the peak clutch torque, may be limited to maintain enough engine torque capability to supply both the clutch torque and inertia torque to accelerate the crankshaft to the target gear input shaft speed in a desired amount of time.

At step 520, one example of how clutch torque to the non-target, low speed input shaft may be applied included linearly applying (e.g. increasing) clutch torque to a predetermined peak value at a rate slower than the rate at which the engine can produce increasing torque, to avoid putting more load torque on the crankshaft through the clutch than the engine is producing. However, there may be additional control methodology to apply clutch torque to the low speed input shaft, which will be discussed below with regard to FIGS. 10-11. It may be understood that such methodology may be utilized in conjunction with method 500, and in particular with regard to step 520 of method 500, for controlling application of the low speed (or non-target) input shaft clutch torque.

Turning now to FIG. 10, a first block diagram 1000 for integrating clutch torque with crankshaft speed control as a secondary actuator to improve engine and clutch torque coordination, is shown. As discussed, the method of block diagram 1000 may be used in the method of FIG. 5. Briefly, the strategy includes continuously commanding engine torque to its maximum value (e.g. threshold not to be exceeded), and the speed control torque required to achieve the desired crankshaft speed may be achieved by absorbing extra torque (e.g. engine torque greater than that used to accelerate the engine at a desired rate) directly with the appropriate low speed (non-target) dual clutch transmission input shaft clutch. In other words, the strategy may include continuously commanding engine torque to a maximum value (e.g. threshold not to be exceeded) while the engine is increasing speed to a target speed, and absorbing extra torque (e.g. engine torque greater than that used to accelerate the engine at a desired rate) via a non-target (e.g. low speed) input shaft clutch to transmit engine torque to the driveline and control engine speed to the target speed. In an example where the low speed (non-target) input shaft clutch cannot absorb enough torque to get the net torque for the crankshaft inertia to the determined value, then engine torque may be limited for the engine speed controller.

Discussed herein, it may be understood that when operating in engine speed control mode, engine torque may be varied to achieve a desired engine speed. Alternatively, when operating in engine torque control mode, engine speed may be varied to achieve a desired engine torque.

Responsive to an indication that drivetrain torque requested exceeds the capability of the electric machine (e.g. 120), a crankshaft speed target 1003 may be determined by the engine controller (e.g. 111B). The crankshaft speed target may be a function of an amount by which the driver demanded torque exceeds the electric machine torque capability, for example. The crankshaft speed target may be further based on current engine speed, accelerator pedal position, etc. A measured crankshaft speed 1041, indicated for example via a Hall effect sensor (e.g. 118B) sensing crankshaft position, may be subtracted from crankshaft speed target 1003 at summing junction 1006. Output from summing junction 1006 may comprise a crankshaft speed error that may be input into proportional integral derivative (PID) engine speed controller 1007. Output from PID engine speed controller 1007 may comprise an engine speed control torque target. The engine speed control torque target may be subtracted from a maximum instantly available engine torque at summing junction 1018. The output of summing junction 1018 comprising a difference between the engine speed control torque target and the maximum instantly available engine torque, may be input to junction 1021. At junction 1021, a minimum (MIN) value between the output of summing junction 1018 and a maximum instantly available low speed (non-target) clutch torque capacity 1012, may be determined. The minimum value determined at junction 1021 may be input to junction 1024, where a maximum (MAX) valve between the output from junction 1021 and a zero torque reference may be determined, such that output from junction 1024 may comprise a positive torque.

Output from junction 1024 may be added to the speed control torque target output from summing junction 1018, at summing junction 1031. Output from summing junction 1031 may be input to an engine torque transfer function 1034. Output from engine torque transfer function 1034 may be input into an engine inertia plus dual clutch torque transfer function 1037, along with output from junction 1024, to control crankshaft speed 1041. More specifically, output from junction 1024 may comprise a value for the low speed input shaft clutch torque 1027, which may be included in the engine inertia plus dual clutch transmission torque transfer function 1037 to control crankshaft speed 1041.

In this way, the engine speed controller may continuously command engine torque to its maximum value (e.g. threshold not to be exceeded), with extra torque going to the low speed input shaft clutch for the speed regulation.

Turning to FIG. 11, a second block diagram 1100 is shown comprising a clutch controller that works in parallel with an engine speed controller to achieve desired behavior for providing clutch capacity to the low speed, non-target input shaft while the engine is running up to a target speed, responsive to drivetrain torque request exceeding the capability of the electric machine, as discussed above. The method of block diagram 1100 may be used in the method of FIG. 5. Briefly, the strategy includes the engine speed controller modulating engine torque for the crankshaft to achieve the desired speed target. In parallel, the low speed transmission input shaft may be commanded such that excess engine torque capability may be sent through the transmission, while preserving sufficient torque to maintain the desired acceleration responsiveness of the crankshaft. The net effect may be similar to the strategy depicted in FIG. 10, with the engine near its maximum torque continuously. More specifically, the strategy may include modulating engine torque to reach a target speed while the engine is increasing speed to a target speed, and in parallel, absorbing excess torque via a non-target clutch to transmit engine torque to the driveline and control engine speed to the target speed. In one example, the strategy may include modulating engine torque to reach a target speed while the engine is increasing speed to the target speed, and in parallel, absorbing a commanded amount of excess torque via a non-target clutch to transmit engine torque to the driveline to cross lash in the system prior to connection and torque delivery through a target clutch. In another example, the strategy may include modulating engine torque to reach a target speed while the engine is increasing speed to the target speed, and in parallel, absorbing excess torque via a non-target clutch to transmit engine torque to the driveline with the intent of preloading the engine to increase engine response at connection and torque delivery through a target clutch when the engine reaches the target speed.

In such examples, the non-target clutch may comprise a clutch that couples engine torque to a non-target (e.g. low speed) input shaft.

Responsive to an indication that drivetrain torque request exceeds the capability of the electric machine (e.g. 120), a driver demanded wheel torque 1103 may be subtracted from electric machine wheel torque 1106 at summing junction 1108. Output from summing junction 1108 may comprise a driver demanded wheel torque required from the engine, while may be multiplied at junction 1118 by 1/final drive ratio 1112 and 1/low speed transmission gear ratio 1115, the output of which may comprise an engine torque desired to meet the driver demanded wheel torque.

In addition, a minimum engine acceleration 1124 may be multiplied by a sum of engine inertia plus flywheel inertia plus ISG inertia, at junction 1130. It may be understood that minimum engine acceleration 1124 may comprise a minimum engine/crankshaft speed acceleration desired to maintain at a minimum. If there is any excess engine capability, it may be sent through the transmission. The output of junction 1130 may comprise a minimum acceleration torque, which may be subtracted from a maximum instantly available engine torque 1133, at summing junction 1134. Output from summing junction 1134 may comprise a maximum excess torque available for the dual clutch transmission low speed input shaft clutch. A minimum value between the required engine torque to meet driver demand (outputted from junction 1118), the maximum excess torque available for the dual clutch transmission, and the maximum instantaneously available low speed clutch torque capacity 1139, may be determined at junction 1142. Such a minimum value obtained at junction 1142 may be output to junction 1145, where a maximum value between the minimum value obtained at junction 1142 compared to a reference zero torque may be obtained, to ensure a positive torque output from junction 1145.

In addition, a difference between a crankshaft speed target 1152 and a measured crankshaft speed 1164, may be obtained at summing junction 1153. As discussed above, a crankshaft speed target 1152 may be determined by the engine controller (e.g. 111B). Output from summing junction 1153 may comprise a crankshaft speed error that may be input into proportional integral derivative (PID) engine speed controller 1007. Output from PID engine speed controller 1007 may comprise an engine speed control crankshaft torque target.

At summing junction 1159, output from the PID engine speed controller 1007 comprising an engine speed control crankshaft torque target may be summed with output from an engine inertia plus dual clutch torque transfer function 1037, where the engine inertia plus dual clutch torque transfer function 1037 may include the output from junction 1145, comprising a low speed input shaft clutch torque. More specifically, output from junction 1145 may comprise a torque command sent to the low speed (non-target) dual clutch transmission input shaft clutch to absorb excess engine torque capability to accelerate the vehicle body while meeting the minimum crankshaft acceleration target.

Output from summing junction 1159 may comprise a net crankshaft torque target, which may be input to an engine torque transfer function 1034, the output of which may feed into the engine inertia plus dual clutch transmission torque transfer function 1037.

Accordingly, a minimum performance for the engine speed controller may be ensured, while putting priority on sending as much torque through the transmission as possible, and while minimizing degradation of the performance of the engine speed controller.

Turning now to FIG. 12, another high-level example method 1200 for predicting a target gear and in examples where a transmission of the vehicle comprises a dual clutch transmission, pre-engaging both the target gear and a non-target gear while the vehicle is operating in an electric-only mode of operation, is shown. More specifically, as discussed above at step 515 of FIG. 5, in some examples, in response to a drivetrain torque request exceeding an electric machine capability, the target gear and the non-target gear may already be preselected. Method 700 depicted at FIG. 7 illustrates an example where the lowest available gear ratios are selected while the vehicle is operating in electric mode, and in response to a drivetrain torque request exceeding electric machine (e.g. 120) capability, one input shaft may be shifted to a higher speed for a target gear. Method 800 depicted at FIG. 8 illustrates an example where a target gear may be predicted and engaged while a vehicle is operating in electric mode. As discussed in relation to FIG. 8 above, method 800 may include always maintaining both input shafts in adjacent gear ratios while the vehicle is operating in electric-only mode, regardless of the number of gear shifts that may take place prior to an engine pull-up event. Method 900 depicted at FIG. 9 illustrates an example where a target gear may be predicted and engaged while the vehicle is operating in electric mode, and may further include engaging the lowest gear ratio on the non-target shaft.

FIG. 12 thus depicts a general method that may be used to predict and engage target gears, and in examples where the vehicle includes a dual clutch transmission, non-target gears, while a vehicle is operating in an electric mode of operation. It may be understood that, while not explicitly illustrated, the method as depicted at FIG. 12 may be used in conjunction with the method of FIG. 5, for example, such that at step 515 of method 500, a target gears, and in some examples, a non-target gear, may be preselected while the vehicle is operating in electric mode.

Method 1200 will be described with reference to the systems described herein and shown in FIGS. 1A-3, though it should be understood that similar methods may be applied to other systems without departing from the scope of this disclosure. Method 1200 may be carried out by a controller, such as controller 12 in FIG. 1A, and may be stored at the controller as executable instructions in non-transitory memory. Instructions for carrying out method 1200 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), etc., according to the method depicted below. It may be understood that some steps of FIG. 12 are substantially equivalent to steps discussed above at FIG. 9, and thus, such steps will only be briefly described in the description of method 1200.

Method 1200 begins at 1205 and includes indicating whether the vehicle is operating in an electric-only mode of operation. If, at 1205, it is indicated that the vehicle is not being operated solely via the electric-only mode of operation, method 1200 may proceed to 1210, and may include maintaining current vehicle operating conditions. For example, if the engine is in operation, engine operation may be maintained. If the electric machine is additionally being indicated to be operating, electric machine operation may be additionally continued. Method 1200 may then end.

Returning to 1205, in response to an indication that the vehicle is being operated solely in an electric mode of operation, method 1200 may proceed to 1215. At 1215, method 1200 may include determining an accelerator position that may result in an engine pull-up. In other words, an accelerator pedal position may be determined which corresponds to a circumstance where a desired wheel torque exceeds a capacity of the electric machine (e.g. 120), thus resulting in the engine being activated or pulled-up, to meet the wheel torque request. In some examples, accelerator pedal position that would result in an engine pull-up may be a function of current vehicle speed and a charge state of an onboard energy storage device (e.g. battery). A lookup table stored at the controller may in some examples be used to indicate accelerator pedal position that may result in driver demand exceeding the capability of the electric machine, as a function of vehicle speed and onboard energy storage device charge state.

Proceeding to 1220, method 1200 may include determining a target gear (corresponding to a target gear ratio) as a function of current vehicle speed and accelerator pedal position that may result in an engine pull-up event. Such a determination may be indicated via a lookup table stored at the vehicle controller, for example. In other words, a shift schedule for the transmission may be included in a lookup table stored at the vehicle controller, where such information may be retrieved in order to indicate the target gear (corresponding to the target gear ratio).

Proceeding to 1225, method 1200 may include indicating whether the target gear is engaged. If the target gear is not engaged, method 1200 may proceed to 1230, and may include commanding the appropriate synchronizer to engage the target gear.

Responsive to the target gear being indicated to be engaged via its appropriate synchronizer, method 1200 may proceed to 1235, and may include indicating whether the vehicle transmission is configured such that a secondary, or non-target gear may be selected. As an example, at 1235, method 1200 may include indicating whether the vehicle transmission comprises a dual clutch transmission, such as the dual clutch transmission depicted at FIG. 3. If it is indicated that the vehicle does not include a transmission with an option to select a secondary, or non-target gear, method 1200 may end.

Alternatively, if at 1235 it is indicated that the vehicle includes a transmission with an option to select a non-target gear in addition to a target gear, method 1200 may proceed to 1240. At 1240, method 1200 may include determining the desired secondary or non-target gear.

In one example, at 1240, determining the non-target gear may include selecting or engaging (e.g. locking) a sequentially lower gear (e.g. higher torque multiplication) than the target gear determined above at 1220. In other words, if the target gear is third gear, for example, then the sequentially lower gear may comprise second gear. In such an example, by selecting the sequentially lower gear, the transmission may have an appropriate gear selected (e.g. the non-target gear) in a case where a vehicle operator increases accelerator pedal position to a position greater than (e.g. more pressed down) than the pedal position that would result in engine pull-up determined at step 1215.

In such an example, if the target gear comprises first gear, such that there is not an option for selecting the sequentially lower non-target gear, then a sequentially higher gear (e.g. second gear in this case), may be selected. Such a strategy may maintain both input shafts of the transmission locked in adjacent gear ratios, such that only one gear may need to be shifted at a time as vehicle inputs change enough to result in a change in the target gear to meet driver demanded torque.

In such an example, consider a condition where the preselected gears (corresponding to preselected gear ratios) for both input shafts are not correct to meet driver demanded torque at a time where an engine start has been commanded. The strategy outlined above provides that a reasonable gear ratio is selected, thus enabling the engine to quickly start and connect to one of the preselected gears, and then to downshift to the final correct, or optimal, gear ratio. In this example, because the target gear is selected based on the minimum pedal position that would result in an engine start event, in the case where pedal positions are significantly more pressed down than the pedal position which would result in an engine start event, a downshift from the target gear may meet the driver demand.

In another example, at 1240, determining the non-target gear may include selecting or engaging (e.g. locking) a sequentially higher gear (e.g. lower torque multiplication) than the target gear determined above at 1220. In other words, if the target gear is third gear, for example, then the sequentially higher gear may comprise fourth gear. In such an example, the non-target gear may be more appropriate than the target gear, in situations where the engine is started in order to maintain battery charge, provide cabin heating, or meet some other requirement other than meeting total vehicle operator torque request.

In such an example, if the target gear determined at 1220 comprises the highest gear (e.g. lowest torque multiplication) of the transmission, or in a case where the transmission input shaft speed corresponding to the next highest gear is below an engine idle speed, then the method may include selecting a sequentially next lower gear (e.g. higher torque multiplication) with respect to the target gear. Such a strategy may maintain both input shafts of the transmission locked in adjacent gear ratios, such that only one gear may be shifted at a time as vehicle inputs change enough to result in a change in the target gear to meet driver demanded torque.

In this example where a sequentially higher gear than the target gear is selected, consider a condition where the preselected gears (corresponding to gear ratios) are not correct to meet driver demanded torque at a time an engine start has been commanded, the strategy outlined provides that a reasonable gear ratio is selected, thus enabling the engine to quickly start and connect to one of the preselected gears, and then to shift into the final correct, or optimal, gear ratio. In this example, because the target gear is selected based on the minimum pedal position that would result in and engine start, a downshift may meet driver demand from pedal positions significantly more pressed down than the minimum pedal position that would result in an engine start. Alternatively, if the engine is being started to meet a vehicle condition other than driveline torque, such a strategy may include connecting to the lowest gear ratio currently selected, or locked, and may then include upshifting to a more appropriate gear ratio if the preselected gear ratio is low enough.

In still another example, at 1240, determining the non-target gear may include selecting a gear (corresponding to a gear ratio) on the non-target input shaft that is appropriate for a current vehicle state, for example appropriate for current accelerator pedal position and vehicle speed. Because only the non-target shaft may be utilized to select such a gear ratio, and because not all gears are represented on the non-target shaft due to the configuration of a dual clutch transmission (see FIG. 3), such a selection may comprise a gear higher or lower than an optimal gear. Such a selection may provide that if the engine were to be started to meet some vehicle requirement other than meeting drivetrain torque (e.g. cabin heating, battery charging), an appropriate gear would already be selected. In such a case, consider a condition where the driver increases pedal position to the minimum pedal position that would result in an engine start. In this example, an appropriate gear would also already be preselected (e.g. the target gear). In either case discussed, the vehicle controller may shift after the engine connects, for example if the accelerator pedal is more pressed down than the minimum pedal position which would result in an engine start, or if the target and non-target gears (corresponding to gear ratios) are not optimal at the time of engine start. Thus, such a strategy ensures that reasonable gears for connection are preselected for engine start commands based on accelerator pedal position and/or engine demand resulting from vehicle requirements other than meeting drivetrain torque requests.

In response to the secondary, or non-target gear being determined at 1240, method 1200 may proceed to 1245. At 1245, method 1200 may include indicating whether the non-target gear is engaged. If the non-target gear is engaged, the method may end. Alternatively, if it is indicated at 1245 that the non-target gear is not engaged, method 1200 may proceed to 1250. At 1250, method 1200 may include commanding an appropriate synchronizer to engage the non-target gear. Similar to that discussed above, commanding the appropriate synchronizer to engage the non-target gear may comprise the controller commanding movement of the appropriate synchronizer via the appropriate selector fork, where the appropriate selector fork may be commanded to generate movement of the appropriate synchronizer via an appropriate shift fork, or selector fork, actuator.

While not explicitly shown, it may be understood that, the target gear and non-target gear may in some examples continuously change while the vehicle is being operated with the engine off as a function of driver demand. Thus, there may be multiple shifting events to engage a target gear/non-target gear while the vehicle is operating in electric mode with the engine off.

In a variation of method 1200, at step 1215, rather than determining a minimum accelerator pedal position that may result in an engine pullup event, the method may include predicting an optimal transmission gear ratio provided that the accelerator pedal position is pushed down 100%, or fully pressed down, and further based on vehicle inputs such as vehicle speed, for example. In such an example, the transmission may predictively shift and lock the transmission in this gear ratio, allowing the vehicle to quickly respond to extreme driver demand to achieve the best vehicle acceleration response. If the vehicle is a dual clutch transmission (see step 1235), then an additional gear ratio (non-target gear) may be locked to provide an alternate gear ratio, as discussed above. One example may include selecting or engaging a sequentially higher gear than the target gear, so that the transmission will have the next gear selected to prepare for an upshift if the vehicle operator were to continue to accelerate after the engine has been connected to the transmission via the target gear. Also, in a case where the vehicle operator depressed the accelerator pedal significantly, but not all the way to fully pressed down (100% pressed down), then the non-target gear (sequentially higher than the target gear) may not provide as much torque multiplication, and thus may enable the engine to directly connect at an optimal gear ratio for that driver demand.

In such an example, if the first or target gear is already the highest gear (lowest torque multiplication), or if the transmission input shaft speed at the next highest gear is below an engine idle speed, the vehicle controller may instead command the sequentially lower gear (than the target gear). Such a strategy may position transmission gear ratios to quickly respond to high drivetrain torque requests.

In this example, consider a condition where the engine is requested to be started to meet a lower torque request, or to maintain battery charge, cabin heating, etc. In such an case, a shift to a more appropriate gear ratio (lower torque multiplication) prior to connecting the engine to reduce engine speed and sound volume at connection, and to reduce potential driveline disturbance. Because such engine start commands to meet a lower torque request or to maintain battery charge, initiate/maintain cabin heating, etc., may occur without a quick, dynamic response, such requests may not result in a significant drivetrain torque request change. Thus, a transmission shift event may be commanded under such conditions just prior to engine start, where the shift event may not adversely affect the driveline. Also, in the case where the transmission is shifted to a gear resulting in a lower transmission input speed and torque multiplication, such a shift may not rely on torque from the driveline to be completed, as positive torque may flow from decelerating transmission components out to the wheels, or potentially out to the engine in response to engaging or partially engaging one of the transmission input clutches. Using the input clutches to dissipate the positive inertia torque may potentially lead to smoother vehicle dynamics during such a shift to a lower torque multiplication gear.

Thus, a system for a vehicle may comprise an engine, a transmission selectively coupled to the engine via one or more clutches, the transmission including one or more shifting elements, an electric machine positioned downstream of the transmission, an electric transmission oil pump, and a controller. The controller may store instructions in non-transitory memory that, when executed, cause the controller to propel the vehicle via the electric machine while the engine is disconnected from the transmission via the one or more clutches being fully open, pre-engage one or more gears of the transmission to prepare for an engine start event, the engine start event in response to a driveline torque request that exceeds a capability of the electric machine. In such an example, pre-engaging the one or more gears may include operating the electric transmission oil pump to provide hydraulic pressure to control the one or more shifting elements to pre-engage the one or more gears.

In one example of the system, the shifting elements includes one or more selector forks and one or more synchronizers.

In one example of the system, the controller may store additional instructions to at least partially connect the engine to the transmission in response to the engine start event, in order to transfer engine torque to the transmission, where the transmission includes the one or more pre-engaged gears and to meet the driveline torque request. In such an example, pre-engaging one or more gears may be based on at least a position of an accelerator pedal and a current vehicle speed, and wherein pre-engaging the one or more gears includes one or more gear shift events while the vehicle is being propelled via the electric machine.

Figure 13:
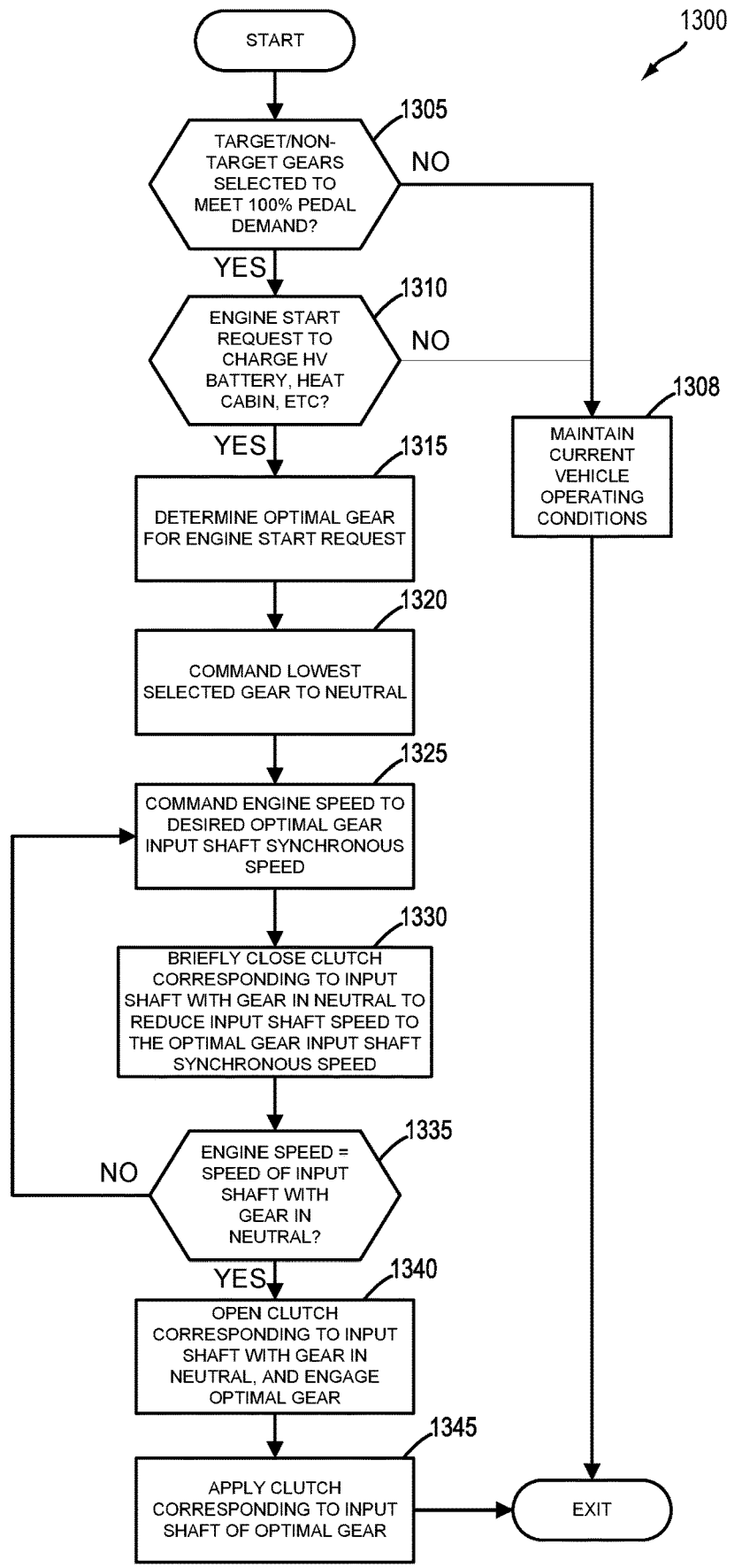
FIG. 13 shows another example of a high level flowchart for an example method for conducting an engine start where one or more gears are preselected prior to the engine start.
Figure 14:
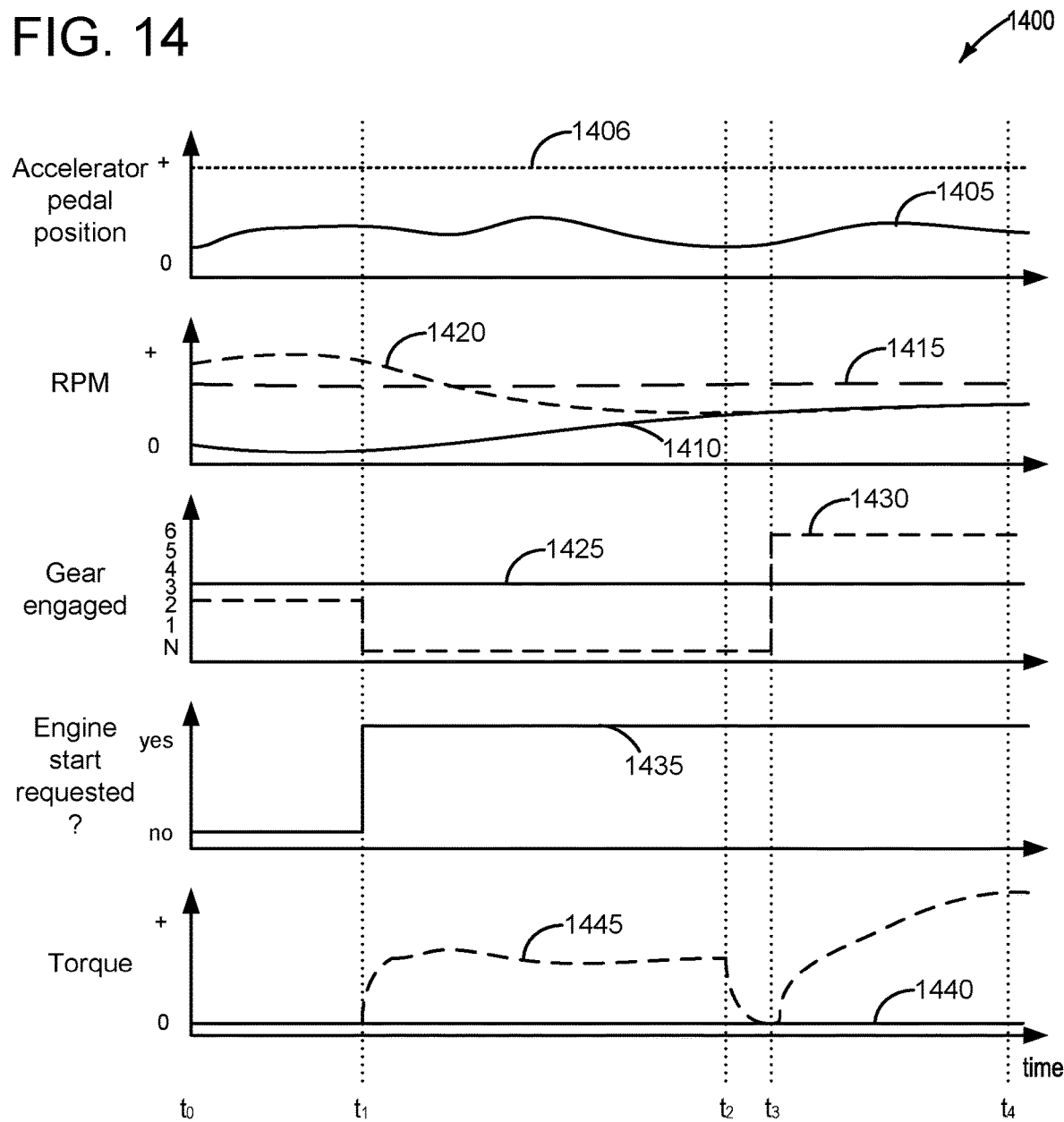
FIG. 14 shows an example timeline for conducting an engine start event, according to the method depicted above at FIG. 13.

Turning now to FIG. 13, an example method for an engine start when selected gears correspond to gears desired in the event that a vehicle operator steps down on an accelerator pedal 100%, or substantially equivalent to 100%, but where the engine start is commanded based on a lower torque request, such as to charge a battery, initiate/maintain cabin heating, etc., is shown.

Method 1300 will be described with reference to the systems described herein and shown in FIGS. 1A-3 though it should be understood that similar methods may be applied to other systems without departing from the scope of this disclosure. Method 1300 may be carried out by a controller, such as controller 12 in FIG. 1A, and may be stored at the controller as executable instructions in non-transitory memory. Instructions for carrying out method 1300 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), etc., according to the method depicted below.

Method 1300 begins at 1305, and may include indicating whether target/non-target gears in a dual clutch transmission are selected/engaged such that said target/non-target gears are gears chosen to meet driver demand in response to a vehicle operator stepping into an accelerator pedal 100%, or substantially equivalent to 100%. Furthermore, at 1305, it may be indicated whether the engine is off. If, at 1305, it is indicated that the target/non-target gears are not selected as a function of 100% accelerator pedal position, or if the engine is in operation, method 1300 may proceed to 1308, and may include maintaining current vehicle operating parameters. Maintaining current vehicle operating parameters may include maintaining the transmission in its current operational state, maintaining the engine and electric machine in their current operational state, etc. Method 1300 may then end.

Returning to 1305, if it is indicated that the target/non-target gears selected are based on meeting 100% accelerator pedal demand, method 1300 may proceed to 1310. At 1310, method 1300 may include indicating whether and engine start is requested to maintain or charge a high voltage battery, heat the vehicle cabin, etc. If an engine start request is not indicated to be requested, method 1300 may proceed to 1308 and may include maintaining current vehicle operating conditions, as discussed above.

Alternatively, if at 1310 it is indicated that the engine is requested to start to maintain or charge a high voltage battery, heat the vehicle cabin, etc., then method 1300 may proceed to 1315. At 1315, method 1300 may include determining an optimal gear for the engine start request. Such an optimal gear may comprise a gear with lower torque multiplication than the gears selected to meet 100% pedal demand, for example.

Subsequent to determining the optimal gear for the engine start request, method 1300 may proceed to 1320. At 1320, method 1300 may include commanding the lowest selected gear to a neutral position. More specifically, the appropriate synchronizer for the lowest selected gear may be commanded via the vehicle controller to disengage the lowest selected gear to a neutral position, via an appropriate selector fork, where the selector fork may be commanded to generate movement of the appropriate synchronizer via an appropriate selector fork actuator.

Subsequent to commanding the lowest selected gear to a neutral position, method 1300 may proceed to 1325. At 1325, method 1300 may include commanding engine speed to a desired optimal gear input shaft synchronous speed. Engine speed may be controlled via torque actuators, such as fuel injectors, throttle, etc. The optimal gear input shaft speed may be indicated as a function of current vehicle speed, and a gear ratio corresponding to the optimal gear for the engine start request.

Proceeding to 1330, method 1300 may include commanding closed the clutch corresponding to the input shaft with the gear in neutral, to reduce input shaft speed to the optimal gear input shaft synchronous speed. With the input shaft in neutral, clutch torque transfer between the engine and decelerating transmission components may be isolated from the driveline and vehicle dynamics, which may reduce or eliminate any potential drivetrain disturbance.

Continuing to 1335, method 1300 may include indicating whether engine speed is substantially equivalent to the speed of the input shaft corresponding to the optimal gear, where both the engine speed and the input shaft speed corresponding to the optimal gear are substantially equivalent to the input shaft synchronous speed for the optimal gear. Responsive to an indication that the engine speed and input shaft speed corresponding to the optimal gear are substantially equivalent, method 1300 may proceed to 1340. At 1340, method 1300 may include commanding open the clutch corresponding to the input shaft with the gear in neutral, and may further include the vehicle controller commanding the appropriate synchronizer to engage the optimal gear for the engine start request. Because the components of the transmission are at the correct relative speeds for the optimal gear for the engine start request, such a shift may be smooth with an added benefit of reduced wear on the synchronizer and with reduced engagement noise.

Proceeding to 1345, responsive to engaging the optimal gear, method 1300 may include applying capacity to the clutch corresponding to the input shaft of the optimal gear, to connect and lock the engine to the transmission and driveline in the optimal gear for the engine start request. Throughout the entirety of method 1300, the other input shaft may remain with the gear engaged corresponding to a gear that may meet 100% pedal demand, as discussed above, such that the gear is continuously available for the engine to connect to if driver demand changes significantly to request a significant increase in drivetrain output torque.

Turning now to FIG. 14, an example timeline 1400 for pre-selecting one or more gears (corresponding to gear ratios) in a transmission while the vehicle is operating in an electric mode of operation, is shown. More specifically, the pre-selected gears include gears pre-selected in the event that the vehicle operator fully steps down on the accelerator pedal, thus requesting a significant amount of increased driveline torque. Timeline 1400 illustrates a gear shift responsive to an indication of an engine start request, under conditions where the accelerator pedal remains less than fully pressed down, and where the engine is requested to maintain battery charge, heat the vehicle cabin, etc.

Timeline 1400 includes plot 1405, indicating an accelerator pedal position, over time. The accelerator pedal may be released (0), or may be pressed further down (+), where pressing down on the accelerator pedal indicates a request for greater acceleration. Line 1406 represents a threshold amount where, if reached, indicates that the accelerator pedal is fully pressed down (e.g. 100% pressed down). Timeline 1400 further includes plot 1410, indicating a speed (RPM) of an engine, plot 1415, indicating RPM of a dual clutch transmission odd gear input shaft (e.g. 302), and plot 1420, indicating RPM of a dual clutch transmission even gear input shaft (e.g. 304), over time. Timeline 1400 further includes plot 1425, indicating a gear selection corresponding to the odd gear input shaft, and plot 1430, indicating a gear selection corresponding to the even gear input shaft, over time. In this example timeline 1400, it may be understood that gears selected may include gears 1-6, and under conditions where the gear is not selected or engaged, the gear may be in a neutral (N) configuration. Timeline 1400 further includes plot 1435, indicating whether an engine start event is requested (yes), or not (no), over time. Timeline 1400 further includes plot 1440, indicating odd input shaft clutch torque, and plot 1445, indicating even input shaft clutch torque, over time. It may be understood that when clutch torque is 0, the clutch if fully open, and increases in clutch torque are indicated via a (+).

At time t0, while not explicitly shown, it may be understood the vehicle is being propelled solely in an electric mode of operation. However, to prepare for an increase in driveline torque request, a gear is preselected on the odd input shaft, and a gear is preselected on the even input shaft. More specifically, third gear is preselected on the odd input shaft, while second gear is preselected on the even input shaft. Accordingly, it may be understood that, in this example, gear preselection is conducted according to method 1300, depicted above at FIG. 13. As such, the preselected gears represent desired or optimal gears under conditions where the vehicle operator requests a significant amount of increased wheel torque, for example under conditions where the vehicle operator steps down on the accelerator pedal 100%, or substantially equivalent to 100%.

Between time t0 and t1, the engine is off, indicated by plot 1410, and because the second and third gears are engaged, their respective even input shaft RPM (e.g. 1420, 1415 respectively) is a function of the engaged gears. More specifically, because second gear comprises a higher torque multiplication than third gear, the even input shaft RPM is higher than the odd input shaft RPM. Furthermore, both input clutches corresponding to the input shafts are fully open, indicated by plots 1440 and 1445. Thus, even though the input shafts are spinning, no torque is transferred to the engine. Still further, accelerator pedal position is less than fully pressed down, thus an engine start event is not requested.

At time t1, an engine start event is indicated to be requested, however the engine start request is not due to the accelerator pedal being pressed down 100%. Instead, it may be understood that the engine start request relates to one or more of a request for battery charging, cabin heating/cooling, etc. In such an example, the vehicle controller may determine that a most appropriate gear to be engaged for engine starting is a higher gear than those preselected. In this example timeline 1400, it may be understood that the vehicle controller indicates that the ideal or most appropriate/optimal gear is sixth gear. Accordingly, the lowest preselected gear (second gear in this example) is disengaged via its appropriate synchronizer, to a neutral state.

With the lowest preselected gear in neutral, between time t1 and t2, capacity is applied to the even input shaft clutch, such that even input shaft clutch torque increases. Engine speed is controlled to a sixth gear input shaft synchronous speed, calculated from current vehicle speed and sixth gear ratio. Accordingly, even input shaft RPMs decrease, and clutch torque is controlled to control even input shaft RPM to match (e.g. within 5% or less) of the engine speed, which is being controlled to maintain the sixth gear input shaft synchronous speed.

At time t2, engine speed and even input shaft speed are substantially equivalent. Thus, the even input shaft clutch is commanded open, resulting in a decrease in clutch torque between time t2 and t3. At time t3, an appropriate synchronizer is controlled via the vehicle controller to engage, or lock, the sixth gear. With the sixth gear locked, capacity to the even input shaft clutch is again applied, to connect the engine to the transmission and driveline in sixth gear. By connecting the engine in sixth gear, the increased driveline torque request may be met between time t3 and t4, without significant driveline torque disturbance, noise, wear and tear on synchronizers, etc. Furthermore, throughout the example timeline 1400, third gear is maintained engaged, and it may thus be understood that third gear is continuously available for the engine to connect to under conditions where the driver changed accelerator pedal position suddenly to request a significant increase in drivetrain output torque.

In this way, while a vehicle is being propelled via power from an electric machine, where an engine is disconnected from the transmission, the transmission may be configured in optimal gear(s) prior to the engine being commanded to start and connect to the driveline. Pre-selecting the gears may be conducted via hydraulic pressure provided via an auxiliary electric transmission oil pump, to actuate shift elements inside the transmission while the engine is stopped and the vehicle is being driven only by electric propulsion. In a case where the vehicle transmission comprises a dual clutch transmission, two gear ratios may be preselected or locked prior to an engine start, which may increase a likelihood that an optimal gear is pre-selected.

The technical effect is to recognize that there may be different options for engaging gears in the transmission while the vehicle is operating in electric only drive mode, to prepare the transmission input shafts for an engine start procedure. Examples may include 1) always having available gears with the lowest available speed ratios selected in electric-only propulsion mode, and then shifting the desired input shaft up to the higher speed required for the target gear while the engine is accelerating and transmitting torque through the other shaft, 2) having an algorithm predict the target gear when a driver demand exceeds the capability of the electric machine, or 3) having an algorithm preselect both the target gear and the non-target gear to mitigate any shifting at the time an engine start is requested, etc. Such algorithms have been discussed in detail above in the detailed description.

The systems described herein, and with reference to FIGS. 1A-3, along with the methods described herein, and with reference to FIG. 5 and FIGS. 7-13, may enable one or more systems and one or more methods. In one example, a driveline operating method comprises propelling a vehicle solely via an electric machine while an engine of the vehicle is off and not connected to a transmission, the electric machine positioned in the driveline downstream of the transmission; and engaging one or more gears of the transmission with the engine off, to prepare the driveline for an engine start event to meet a vehicle operator torque request. In a first example of the method, the method further includes wherein engaging one or more gears further comprises engaging one or more gears with a lowest torque multiplication available that allows an input shaft to the transmission to remain above an engine idle speed while the vehicle is propelled solely via the electric machine. A second example of the method optionally includes the first example, and further comprises shifting the one or more gears to another gear to meet the vehicle operator torque request prior to connecting the engine to the transmission. A third example of the method optionally includes any one or more or each of the first and second examples, and further comprises predicting vehicle operating conditions that will result in the engine start event. A fourth example of the method optionally includes any one or more or each of the first through third examples, and further includes wherein the vehicle operating conditions that result in the engine start event include a minimum accelerator pedal position and a current vehicle speed. A fifth example of the method optionally includes any one or more or each of the first through fourth examples, and further includes wherein engaging the one or more gears of the transmission further comprises engaging a target gear comprising an optimal gear for connecting the engine to the transmission at the time of the engine start event. A sixth example of the method optionally includes any one or more or each of the first through fifth examples, and further includes wherein engaging the one or more gears of the transmission further comprises additionally engaging a non-target gear, where the transmission comprises a dual clutch transmission. A seventh example of the method optionally includes any one or more or each of the first through sixth examples, and further includes wherein the non-target gear comprises a sequentially lower gear than the target gear, provided that the target gear is not the lowest available gear. An eighth example of the method optionally includes any one or more or each of the first through seventh examples, and further includes wherein the non-target gear comprises a sequentially higher gear than the target gear, provided that the target gear is not the highest available gear. A ninth example of the method optionally includes any one or more or each of the first through eighth examples, and further includes wherein the target gear comprises the optimal gear for connecting the engine to the transmission at the time of the engine start event, and where the non-target gear corresponds to an appropriate gear ratio for a current accelerator pedal position and vehicle speed. A tenth example of the method optionally includes any one or more or each of the first through ninth examples, and further includes wherein engaging the one or more gears further comprises operating an electric transmission pump to provide hydraulic fluid to actuate one or more shift elements of the transmission.

Another example of a driveline operating method comprises propelling a vehicle solely via an electric machine while an engine of the vehicle is off and not connected to a transmission, the electric machine positioned in the driveline downstream of the transmission; predicting and engaging a target transmission gear while the engine is off to prepare the driveline for an engine start event responsive to an operator of the vehicle pressing down on an accelerator pedal greater than a threshold accelerator pedal position. In a first example of the method, the method further includes wherein the threshold accelerator pedal position comprises an accelerator pedal position substantially equivalent to 100% pressed down, or fully pressed down. A second example of the method optionally includes the first example, and further comprises additionally engaging a non-target gear, the non-target gear comprising a sequentially higher or sequentially lower gear than the target gear. A third example of the method optionally includes any one or more or each of the first and second examples, and further includes wherein the engine start event is not a result of the accelerator pedal position greater than the threshold accelerator pedal position, but the result of a lower torque request, the lower torque request including a request for heating/cooling of a cabin of the vehicle and/or a request to charge a battery of the vehicle. A fourth example of the method optionally includes any one or more or each of the first through third examples, and further comprises in response to the lower torque request, indicating a desired gear higher than the target gear and non-target gear to engage to meet the lower torque request; disengaging the non-target gear or the target gear to a neutral configuration; controlling an engine speed to a transmission input shaft synchronous speed corresponding to the desired gear, the transmission input shaft synchronous speed corresponding to a speed of a transmission input shaft when the desired gear is engaged at a current vehicle speed; commanding capacity to a clutch corresponding to the transmission input shaft to reduce the speed of the transmission input shaft to the engine speed controlled to the transmission input shaft synchronous speed; fully opening the clutch corresponding to the transmission input shaft responsive to the speed of the transmission speed being substantially equivalent to the engine speed; engaging the desired gear subsequent to fully opening the clutch; and commanding capacity to the clutch subsequent to the engaging of the desired gear to connect the engine to the transmission to meet the lower torque request. A fifth example of the method optionally includes any one or more or each of the first through fourth examples, and further comprises connecting the engine to the transmission at the target gear in response to the vehicle operator pressing down on the accelerator pedal greater than the threshold accelerator pedal position.

An example of a system for a vehicle comprises an engine; a transmission selectively coupled to the engine via one or more clutches, the transmission including one or more shifting elements; an electric machine positioned downstream of the transmission; an electric transmission oil pump; and a controller storing instructions in non-transitory memory that, when executed, cause the controller to: propel the vehicle via the electric machine while the engine is disconnected from the transmission via the one or more clutches being fully open; pre-engage one or more gears of the transmission to prepare for an engine start event, the engine start event in response to a driveline torque request that exceeds a capability of the electric machine, where pre-engaging the one or more gears includes operating the electric transmission oil pump to provide hydraulic pressure to control the one or more shifting elements to pre-engage the one or more gears. In a first example of the system, the system further includes wherein the one or more shifting elements includes one or more selector forks actuators and one or more synchronizers. A second example of the system optionally includes the first example, and further comprises additional instructions to at least partially connect the engine to the transmission in response to the engine start event, in order to transfer engine torque to the transmission where the transmission includes one or more pre-engaged gears and to meet the driveline torque request; and wherein pre-engaging one or more gears is based on at least a position of an accelerator pedal and a current vehicle speed, and wherein pre-engaging the one or more gears includes one or more gear shift events while the vehicle is being propelled via the electric machine. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
propelling a vehicle solely via an electric machine while an engine of the vehicle is off and not connected to a dual clutch transmission, the electric machine positioned in a driveline downstream of the transmission; and
engaging a first target gear with a first target input shaft to the transmission and engaging a first non-target gear with a first non-target input shaft to the transmission with the engine off and while first and second clutches of the dual clutch transmission are open in response to entering a driveline mode where the vehicle is propelled solely via the electric machine.

2. The method of claim 1, further comprising engaging the first target gear with a lowest torque multiplication available that allows the first target input shaft to the transmission to remain above an engine idle speed while the vehicle is propelled solely via the electric machine.

3. The method of claim 1, further comprising shifting to a second target gear in response to a request to start the engine, the second target gear determined as a function of an amount a requested driveline torque exceeds a torque capability of the electric machine.

4. The method of claim 1, wherein the dual clutch transmission includes a total of two clutches.

5. The method of claim 1, wherein the first non-target gear comprises a sequentially lower gear than the first target gear.

6. The method of claim 1, wherein the first non-target gear comprises a sequentially higher gear than the first target gear.

7. The method of claim 1, wherein the first target gear comprises an optimal gear for connecting the engine to the transmission at a time of an engine start event, and where the first non-target gear corresponds to an appropriate gear ratio for a current accelerator pedal position and vehicle speed.

8. The method of claim 1, further comprising operating an electric transmission pump to provide hydraulic fluid to actuate one or more shift elements of the transmission in order to engage the first target gear and the first non-target gear, the one or more shift elements comprising one or more selector fork actuators and one or more synchronizers.

9. The method of claim 1, further comprising predicting vehicle operating conditions that will result in an engine start event.

10. The method of claim 9, wherein the predicting includes a threshold accelerator pedal position and/or a current vehicle speed.

11. A driveline operating method, comprising:
propelling a vehicle solely via an electric machine while an engine of the vehicle is off and not connected to a dual clutch transmission, the electric machine positioned in a driveline downstream of the transmission;
predicting and engaging a first target transmission gear and a first non-target transmission gear while the engine is off in response to entering a driveline mode where the vehicle is propelled solely via the electric machine, and where first and second clutches of the dual clutch transmission are open while the engine is off and the first target transmission gear and the first non-target transmission gear are engaged.

12. The method of claim 11, further comprising starting the engine in response to an accelerator pedal position being substantially equivalent to 100% pressed down, or fully pressed down.

13. The method of claim 11, wherein engaging the first non-target transmission gear comprises engaging a sequentially higher or a sequentially lower gear than the first target transmission gear.

14. The method of claim 11, further comprising connecting the engine to the dual clutch transmission via the second clutch in response to an engine start request.

15. The method of claim 11, further comprising starting the engine in response to a request for heating/cooling of a cabin of the vehicle and/or a request to charge a battery of the vehicle.

16. The method of claim 15, further comprising, in response to the request for heating/cooling of the cabin and/or the request to charge the battery:
disengaging either the first non-target transmission gear or the first target transmission gear to a neutral configuration; and
engaging a desired gear that is higher than the first target transmission gear and the first non-target transmission gear in response to the request.

17. A system for a vehicle, comprising:
an engine;
a transmission selectively coupled to the engine via two clutches, the transmission including one or more shifting elements;
an electric machine positioned downstream of the transmission;
an electric transmission oil pump; and
a controller storing instructions in non-transitory memory that, when executed, cause the controller to:
propel the vehicle via the electric machine while the engine is disconnected from the transmission via the two clutches being fully open;
pre-engage a first target gear of the transmission and a first non-target gear of the transmission while propelling the vehicle solely via the electric machine, selecting the first non-target gear in response to accelerator pedal position and vehicle speed, and starting the engine in response to a driveline torque request that exceeds a capability of the electric machine, and where pre-engaging the first target gear and the first non-target gear includes operating the electric transmission oil pump to provide hydraulic pressure to control the one or more shifting elements to pre-engage the first target gear and the first non-target gear.

18. The system of claim 17, wherein the one or more shifting elements include one or more selector fork actuators and one or more synchronizers, and where the transmission includes a total of two clutches.

19. The system of claim 17, further comprising additional instructions to at least partially connect the engine to the transmission in response to the engine being started in order to transfer engine torque to the transmission to meet the driveline torque request; and wherein pre-engaging the first target gear and the second non-target gear is based on at least a position of an accelerator pedal and a current vehicle speed, and wherein pre-engaging the first target gear and the first non-target gear includes one or more gear shift events while the vehicle is being propelled via the electric machine.

* * * * *